(12) United States Patent
Bar-On

(10) Patent No.: US 8,331,708 B2
(45) Date of Patent: Dec. 11, 2012

(54) METHOD AND APPARATUS FOR A MULTIDIMENSIONAL DISCRETE MULTIWAVELET TRANSFORM

(75) Inventor: Ilan Bar-On, Haifa (IL)

(73) Assignee: Numeri Ltd., Haifa (IL)

( * ) Notice: Subject to any disclaimer, the term of this patent is extended or adjusted under 35 U.S.C. 154(b) by 1154 days.

(21) Appl. No.: 12/087,859

(22) PCT Filed: Jan. 18, 2007

(86) PCT No.: PCT/IL2007/000073
§ 371 (c)(1),
(2), (4) Date: Jul. 16, 2008

(87) PCT Pub. No.: WO2007/083312
PCT Pub. Date: Jul. 26, 2007

(65) Prior Publication Data
US 2009/0034624 A1    Feb. 5, 2009

Related U.S. Application Data
(60) Provisional application No. 60/759,551, filed on Jan. 18, 2006.

(51) Int. Cl.
G06K 9/46 (2006.01)
G06K 9/36 (2006.01)
G06K 9/00 (2006.01)

(52) U.S. Cl. ........ 382/248; 382/232; 382/233; 382/244; 382/253

(58) Field of Classification Search ............. 382/232, 382/233, 244, 248, 253
See application file for complete search history.

(56) References Cited

U.S. PATENT DOCUMENTS
2004/0207725 A1* 10/2004 Fandrianto et al. ........ 348/14.13

OTHER PUBLICATIONS

Fowler, J.—"Wavelet Transforms for Vector Fields Using Omnidirectionally Balanced Multiwavelets"—IEEE 2002, pp. 3018-3027.*
Koren, I.—"A Discrete Dyadic Wavelet Transform for Multidimensional Feature Analysis"—IEEE 1997, pp. 1-30.*
Albuz, E.—"Vector-Wavelet Based Scalable Indexing and Retrieval System for Large Color Image Archives"—IEEE 1999, pp. 3021-3024.*
Xia, X.—"Vector-Valued Wavelets and Vector Filter Banks"—IEEE 1996, pp. 508-518.*
International Preliminary Report on Patentability Dated Jan. 22, 2009 From the International Bureau of WIPO Re.: Application No. PCT/IL2007/000073.

* cited by examiner

*Primary Examiner* — Bernard Krasnic

(57) ABSTRACT

Methods and apparatuses for compressing and decompressing digital data. The method for compressing digital data comprises a number of steps: a) generating a vector-valued dataset according to the digital data, b) transforming the vector-valued dataset into multiwavelet coefficients, and c) entropically coding the multiwavelet coefficients. The method for decompressing digital data is substantially made up of the same steps as the method for compressing digital data but functioning in a reverse manner.

20 Claims, 13 Drawing Sheets

Figure 3: A 2-dimensional image with $N_y = 30$ rows, and $N_x = 24$ columns.

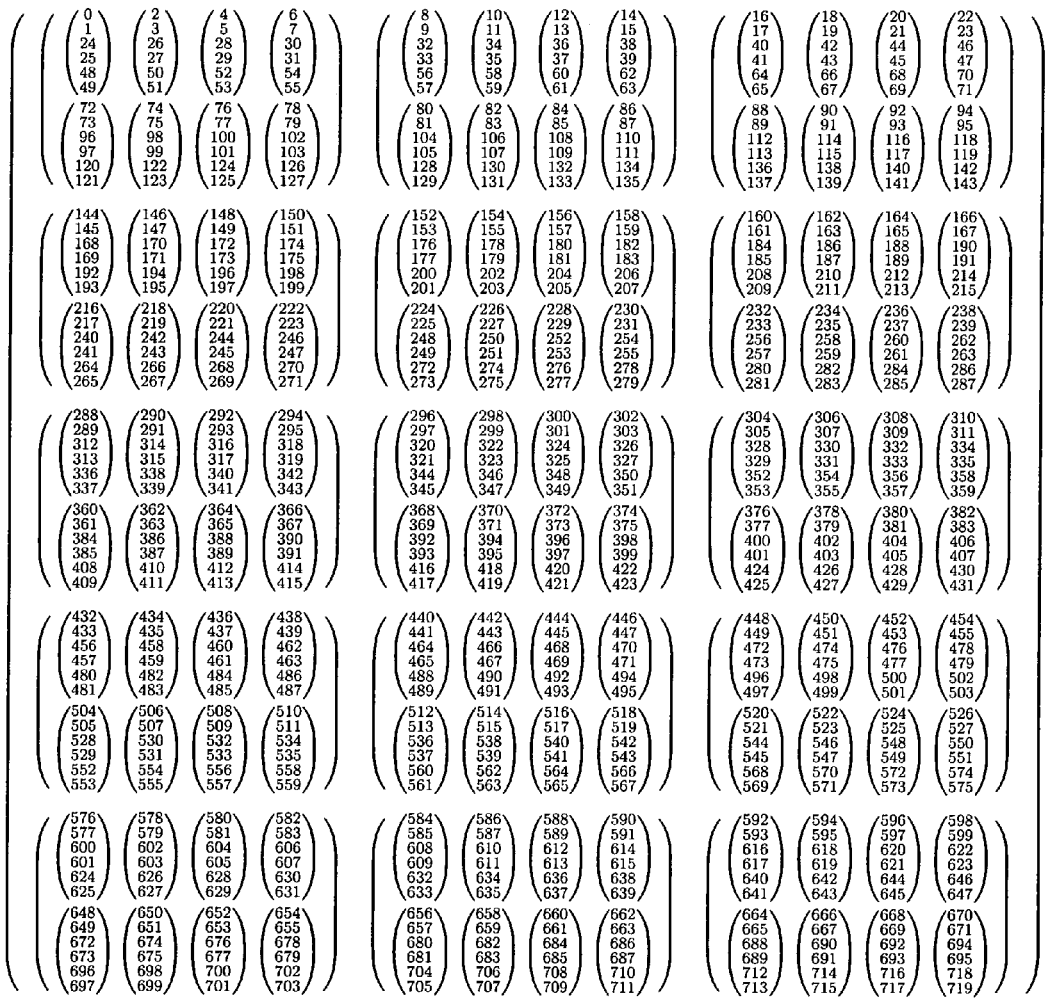
Figure 4: Consecutive indexing for
outer dimensions: $(p_y = 5) \times (p_x = 3)$,
inner dimensions: $(n_y = 2) \times (n_x = 4)$,
and multiwavelet order $r = (r_y = 3) \times (r_x = 2) = 6$.

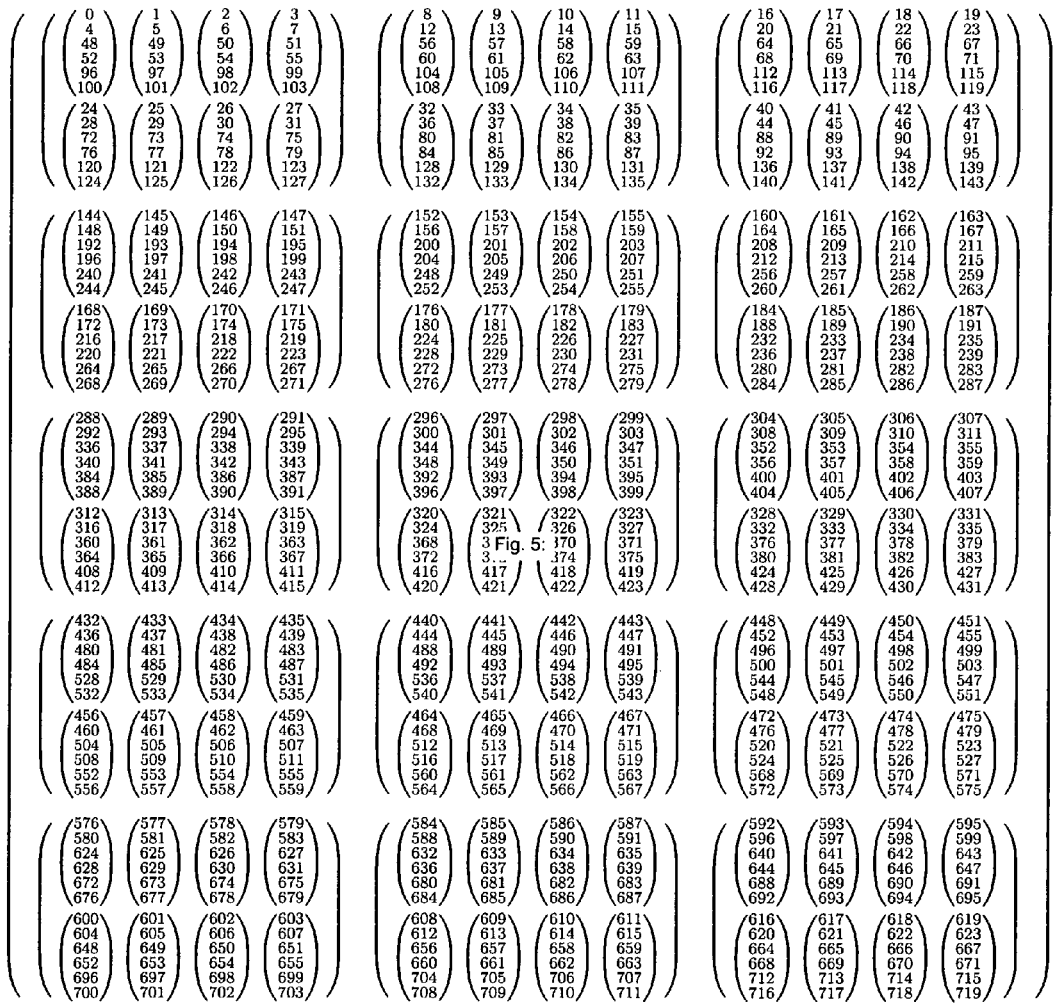
Figure 5: Interleaved indexing for
outer dimensions: $(p_y = 5) \times (p_x = 3)$,
inner dimensions: $(n_y = 2) \times (n_x = 4)$,
and multiwavelet order $r = (r_y = 3) \times (r_x = 2) = 6$.

Figure 6: The shuffled image for $p_x = 3$, $n_x = 4$, $r_x = 2$ and $p_y = 5$, $n_y = 2$, $r_y = 3$.

Figure 7: The x-shuffled image, for $p_x = 3$, $n_x = 4$, $r_x = 2$ and $p_y = 5$, $n_y = 2$, $r_y = 3$.

Figure 8:
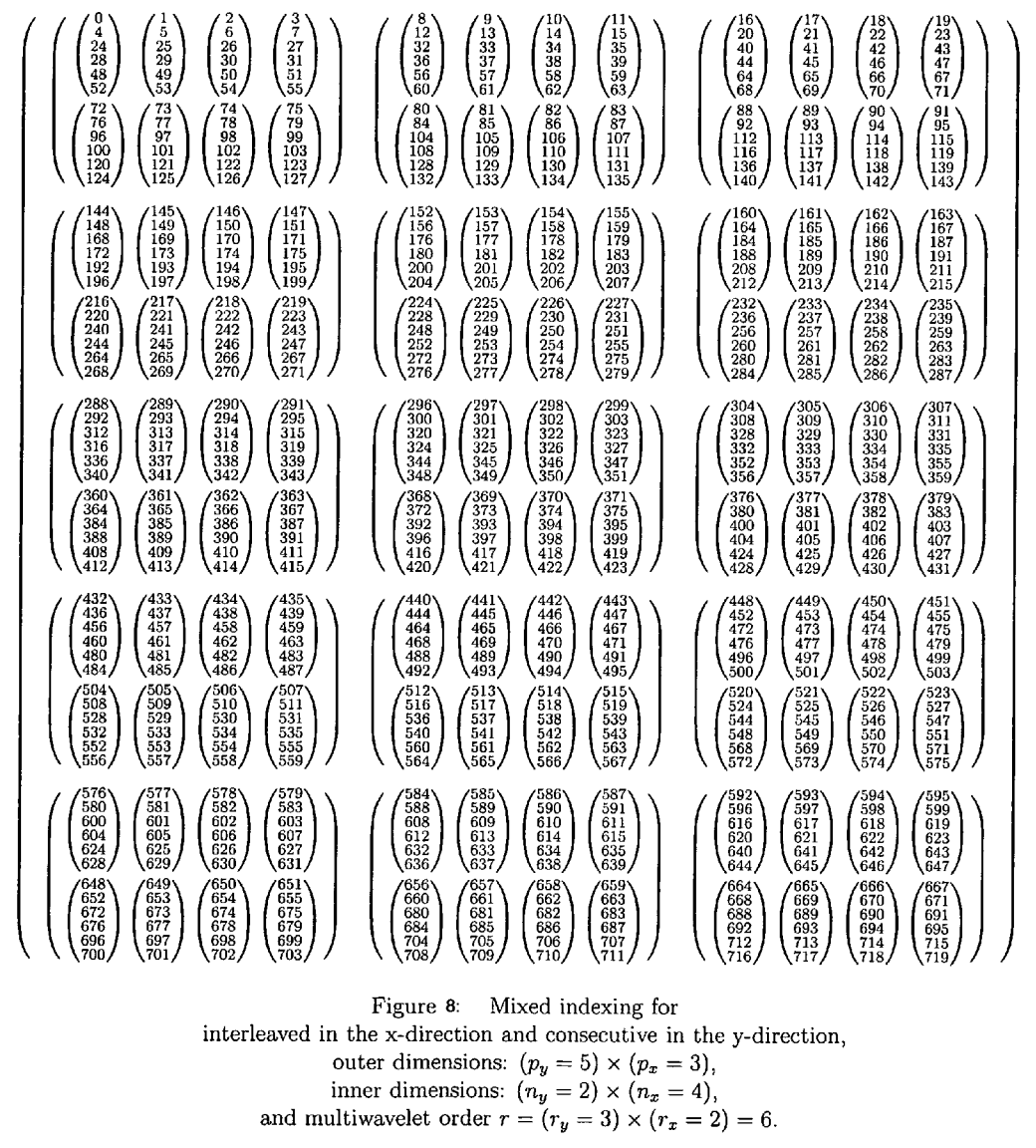

Figure 8: Mixed indexing for
interleaved in the x-direction and consecutive in the y-direction,
outer dimensions: $(p_y = 5) \times (p_x = 3)$,
inner dimensions: $(n_y = 2) \times (n_x = 4)$,
and multiwavelet order $r = (r_y = 3) \times (r_x = 2) = 6$.

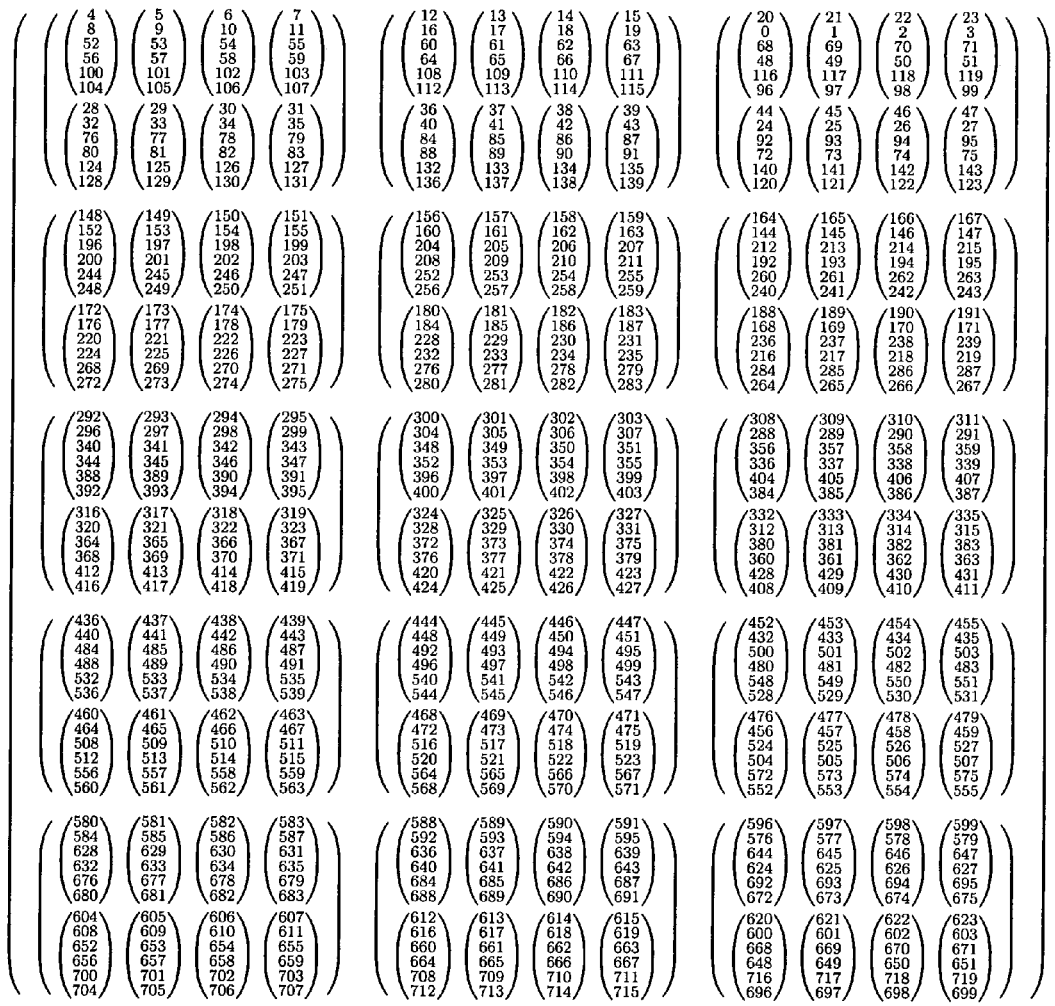
Figure 9: The respective $n_2 = 4$ right boundary points.

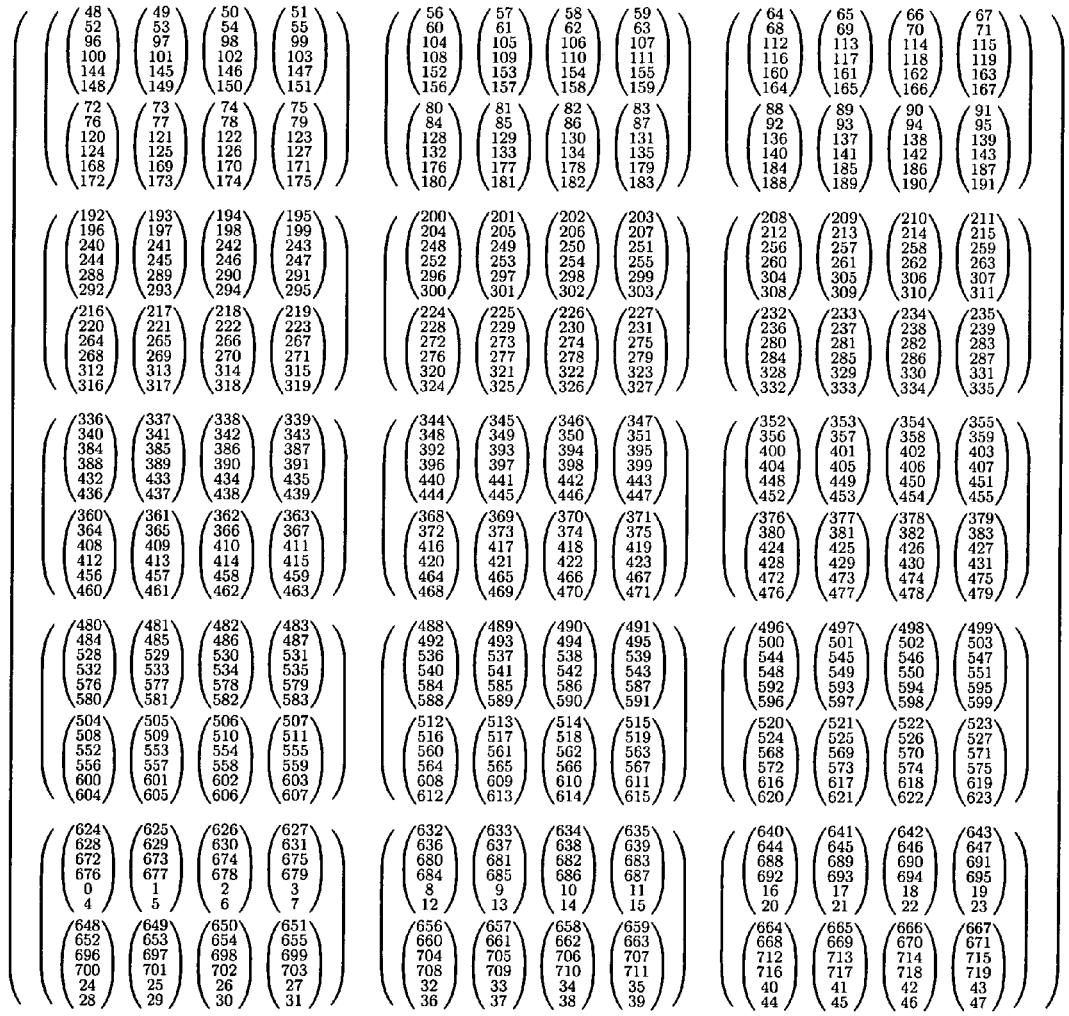
Figure 10: The respective $n_1 = 2$ bottom boundary points.

Figure 11: Cyclicly top shifted image by $n_1 = 2$.

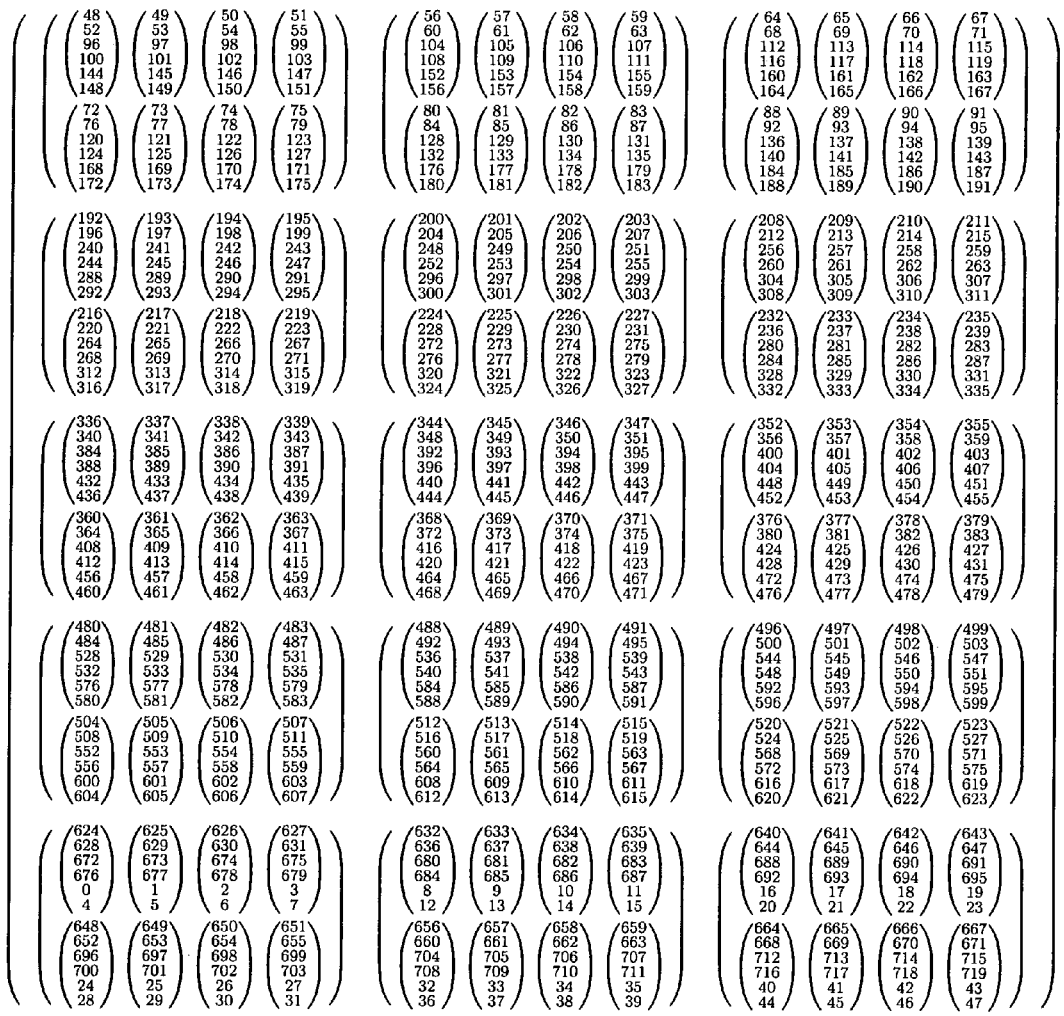
Figure 12: The respective $n_1 = 2$ bottom boundary points.

METHOD AND APPARATUS FOR A MULTIDIMENSIONAL DISCRETE MULTIWAVELET TRANSFORM

RELATED APPLICATIONS

This Application is a National Phase of PCT Patent Application No. PCT/IL2007/000073 having International filing date of Jan. 18, 2007, which claims the benefit of U.S. Provisional Patent Application No. 60/759,551 filed on Jan. 18, 2006. The contents of the above Applications are all incorporated herein by reference.

FIELD AND BACKGROUND OF THE INVENTION

The present invention relates to a method and an apparatus for digital data compression and, more particularly, but not exclusively to a method and an apparatus for digital data compression of images, audio, and video using wavelet-based transformations.

Digital multimedia includes video, images and audio data, typically involving a large amount of data. For instance, a twenty-second digitized movie has a data size of 650 Mbytes, and a two hours worth of uncompressed video data would occupy 360 compact disks. Similarly, transmitting a two-hour movie having an uncompressed data format at a rate of 128 kbps would take 169 days.

Video and image compression have been widely adopted since the advent of digital multimedia technology and the popularization of DVD, web images, mp3 and digital cameras. Several image compression standards exist to compress images, such as JPEG and JPEG2000. Several video compression standards have been adopted for a variety of different applications. These include the International Standard Organization (ISO) video compression formats MPEG-1, MPEG-2 and MPEG-4, developed by the Moving Picture Experts Group, and the ITU H.261 and H.263 video standards. These standards came into being at different times when the stage of multimedia technology development had different needs. For example, the MPEG-1 standard supports a 352×240 resolution and an input frame rate of 30 frames per second (FPS), and produces video quality slightly below the quality of conventional VCR videos, whereas MPEG-2 supports up to a 1280×720 resolution and an input frame rate of 60 FPS and produces video quality sufficient for all major TV standards, including HDTV, with full CD-quality audio. MPEG-2 is also used with DVD-ROM since it has a relatively high compression ratio, defined simply as the ratio of compressed to uncompressed data. The MPEG-4 standard is based on MPEG-1 and MPEG-2 technology and is designed to transmit video and images over a narrower bandwidth. MPEG-4 further provides the mixing of video with text, graphics and 2-D and 3-D animation layers. H.261 and H.263 are mainly developed for teleconferencing applications that require both the encoder and decoder to operate in real time.

However, both the JPEG and the MPEG standards have a number of known drawbacks and limitations. The key to the JPEG algorithm is a discrete cosine transform (DCT) of N×N blocks. Each block is computed using the DCT, the results are quantized, and then entropy coded. Though information can be efficiently coded, using a DCT based compression, the limitations of the DCT basis Cosine functions, are that although the transform is of a global nature, the JPEG algorithm uses frequency analysis only for small areas of the image and therefore results in blocking artifacts at low compression rates. Thus, the overhead for large image size is increased. MPEG, which is based on JPEG images, suffers from the same drawbacks and limitations. Moreover, the MPEG has a number of additional limitations. For example, the MPEG compression causes motion artifacts, which are blocking artifacts in scenes with high motion. In addition, the MPEG compression causes signal degradation as single erroneous bits may affect the visual quality of large areas of the image. Moreover, the MPEG compression has high complexity due to motion estimation and compensation.

Furthermore, the existing video compression standard, such as MPEG-2 defines scalable profiles, which exploit classic DCT-based schemes with motion compensation. Unfortunately, spatial scalability as proposed by the MPEG-2 coding standard is inefficient because the bitrate overhead is too large. Additionally, the solutions defined in MPEG-2 do not allow flexible allocation of the bitrate. There is a great demand for flexible bit allocation to individual layers, for example for fine granularity scalability (FGS), which is also already proposed for MPEG-4, where the fine granular enhancement layers are intra-frame encoded.

A known compression method that is devoid of most of the aforementioned limitation is the discrete wavelet transform (DWT)-based compression. DWT-based compression is a form of finite impulse response filter. Most notably, the DWT is used for signal coding, where the properties of the transform are exploited to represent a discrete signal in a more redundant form, such as a Laplace-like distribution, often as a preconditioning for data compression. DWT is widely used for handling video and image compression to recreate faithfully the original images under high compression ratios. DWT produces as many coefficients as there are pixels in the image. These coefficients can be compressed more easily because the information is statistically concentrated in just a few coefficients. During the compression, process coefficients are quantized and the quantized values are entropy encoded and preferably run length encoded. The lossless nature of DWT results in zero data loss or modification on decompression to support better image quality under higher compression ratios at low-bit rates and highly efficient hardware implementation.

The principle behind the wavelet transform is to hierarchically decompose the input signals into a series of successively lower resolution coarse signals and their associated detail signals. At each level, the coarse signals and detailed signals contain the information necessary for reconstruction back to the next higher resolution level. One-dimensional DWT processing can be described in terms of a filter bank, wavelet transforming a signal is like passing the signal through this filter bank wherein an input signal is analyzed in both low and high frequency bands. The outputs of the different filter stages are the wavelet and scaling function transform coefficients. The decompression operation is the inverse of the compression operation. Finally, the inverse wavelet transform is applied to the de-quantized wavelet coefficients. This produces the pixel values that are used to create the image.

In particular, the discrete wavelet transform is usually related to two pairs of filters. One pair comprises lowpass $\{\tilde{h}_k\}$ and highpass $\{\tilde{g}_k\}$ analysis filters, and the other pair comprises lowpass $\{h_k\}$ and highpass $\{g_k\}$ synthesis filters. The lowpass filters come from a respective pair of biorthogonal functions. One biorthogonal function is an analysis scaling function $\tilde{\Phi}(x)$ and the other is a synthesis scaling function $\Phi(x)$. $\tilde{\Phi}(x)$ and $\Phi(x)$ are defined by the following respective refinable equations:

$$\tilde{\phi}(x) = \sqrt{2} \sum_k \tilde{h}_k \tilde{\phi}(2x-k), \tag{3.1}$$

$$\phi(x) = \sqrt{2} \sum_k h_k \phi(2x-k).$$

In the same manner, the highpass filters come from another pair of biorthogonal functions. The first biorthogonal function is an analysis wavelet function $\tilde{\psi}(x)$ and the other is a synthesis wavelet function ψ(x). ψ̃(x) and ψ(x) are defined by the following related refinable equations:

$$\tilde{\psi}(x) = \sqrt{2} \sum_k \tilde{g}_k \tilde{\psi}(2x-k), \quad (3.2)$$

$$\psi(x) = \sqrt{2} \sum_k g_k \psi(2x-k).$$

A more elaborate mathematical discussion on the filters can be found in David F. Walnut, An Introduction to Wavelet Analysis, Birkhauser, 2001, which is herein incorporated in its entirety by reference into the specification.

Biorthogonality then implies the following conditions:

$$\sum_k h_k \tilde{h}_{k-2l} = \sum_k g_k \tilde{g}_{k-2l} = \delta_l, \quad (3.3)$$

$$\sum_k h_k \tilde{g}_{k-2l} = \sum_k g_k \tilde{h}_{k-2l} = 0,$$

$$\delta_l = \begin{cases} 1 & l=0 \\ 0 & l \neq 0. \end{cases}$$

which are the equivalent of the perfect reconstruction property in signal analysis, see M. Vetterli and J. Kovacevic, Wavelets and Subband Coding, Prentice Hall, 1995, which is herein incorporated in its entirety by reference into the specification.

The DWT and IDWT can now be defined to move from the signal domain to the wavelet domain and vice versa. In particular, based on the input signal $\{c^{(l)}(i) \in R\}$ and the analysis filters as above, the DWT can be defined as follows:

$$c^{(0)}(i) = \sum_j \tilde{h}_{j-2i} c^{(1)}(j), \quad (3.4)$$

$$d^{(0)}(i) = \sum_j \tilde{g}_{j-2i} c^{(1)}(j),$$

where the $c^{(0)}(i)$ denotes the lower resolution representation of the original signal and $d^{(0)}(i)$ denotes additional detailed parts of the signal. Conversely, given the lower resolution representation $\{c^{(0)}(i) \in R\}$ and the additional detailed parts $\{d^{(0)}(i) \in R\}$, we define the IDWT as:

$$c^{(1)}(2i) = \sum_j h_{2(i-j)} c^{(0)}(j) + \sum_j g_{2(i-j)} d^{(0)}(j), \quad (3.5)$$

$$c^{(1)}(2i+1) = \sum_j h_{2(i-j)+1} c^{(0)}(j) + \sum_j g_{2(i-j)+1} d^{(0)}(j).$$

In known applications, such as encoders, decoders, compressor, and decompressor, the compressed input comprises highly correlated signals, such as voice samples, audio samples pixel based images, and video, which are captured by the wavelet coefficients and computed using the DWT. The transformed signals can be efficiently compressed, usually in a lossy way, yielding an encoded bit-stream that can be transmitted over a computer network such as the Internet or stored on a medium such as a DVD disk. Applications, which are designed to decode such transformed signals, reconstruct the encoded bit-stream using the IDWT. Though the resulting signal is not mathematically the same as the original, it can be used for many purposes.

U.S. Pat. No. 6,570,510, issued on May 27, 2003, illustrates an example of such application. The patent discloses an apparatus that comprises a DWT engine, a code block manager, and an entropy encoder. The code block manager comprises a controller, which losslessly compresses the transform coefficients and stores them in code block storage for buffering. The entropy coder comprises entropy encoders, each comprising a decoder for decoding the losslessly compressed transformed coefficients prior to entropy encoding.

One major advantage of the DWT based compression over the DCT based compression is the temporal or spatial locality of the base functions. Such base functions require less computational complexity than is needed for the fast Fourier transformation (FFT) functions of the DCT based compression.

However, wavelet compression has a number of drawbacks and limitations. For example, wavelets, which are typically used in video compression algorithms, are typically real valued, compactly supported, and continuous 2-band wavelets. However, no such wavelets exist which are both orthogonal and linear phase symmetric, It is important to have a wavelet that provides both qualities as orthogonally is important for preserving the overall energy of the transformed coefficients, while symmetry is important for preventing visual artifacts. Moreover, while the wavelet representation is optimal for one-dimensional signals, the current separable methods for compressing higher dimensional signals, such as image and video, fail to detect directional contours, such as edges and surfaces comprising the digital data.

There is thus a widely recognized need for, and it would be highly advantageous to have, a DWT based compression method and system devoid of the above limitations.

SUMMARY OF THE INVENTION

According to one aspect of the present invention there is provided a method for compressing digital data. The method comprises the following steps:
a) generating a vector-valued dataset according to the digital data, b) transforming the vector-valued dataset into multiwavelet coefficients, and c) entropically coding the multiwavelet coefficients.

Preferably, the method further comprises a step between step a) and b) of defining at least one non-scalar multiwavelet filter according to a predefined wavelet filter, the transforming is performed using the at least one non-scalar multiwavelet filter.

More preferably, wherein by the transforming allows the performance of a discrete wavelet transformation.

Preferably, by the transforming is preformed using a multiwavelet filter.

More preferably, by the multiwavelet filter is a member of the following group: an orthogonal multiwavelet filter, a biorthogonal multiwavelet filter, a non-separable filter, a 2D quincunx filter, a hexagonal filter, a 3D FCC filter, 2-band filter, and multi-band filter.

Preferably, the transforming is performed according to a packet transform sequence.

Preferably, the transforming is performed using a multiwavelet filter representing an array of functions.

Preferably, the transforming comprises a step of reducing the number of significant multiwavelet coefficients.

Preferably, the transforming is performed using a member of the following group: a periodic extension method and a symmetric extension method.

Preferably, the method further comprises a step between step b) and c) of arranging the multiwavelet coefficients as scalar coefficients.

More preferably, the scalar coefficients are wavelet coefficients.

Preferably, the method comprises a stage between b) and c) of quantifying the multiwavelet coefficients, and wherein the entropically coding of c) comprises entropically coding the quantified multiwavelet coefficients.

Preferably, the digital data is a member in the following group: an image, a sequence of image, an audio stream, and a video steam.

Preferably, the method further comprises a stage before a) of converting the color model of the digital data to a YUV color model.

Preferably, the digital data is a sequence of frames represented in YUV color model, further comprises a stage before a) of partitioning the sequence of frames to Y, U and V group of frames (GOFs), the vector-valued dataset being generated according to each one of the Y, U and V GOFs separately.

Preferably, the vector-valued dataset is a first array having one or more dimensions of second arrays having one or more dimensions, wherein each the second array comprises a vector of values of the digital data.

Preferably, the method further comprises a step of adjusting the digital data according to the dimensions of the vector-valued dataset.

Preferably, the transforming is performed according to a multidimensional dyadic separable discrete multiwavelet transform.

Preferably, the step of entropy coding is performed according to one member of the group consisting of: a scalar quantization method, a vector quantization method, a Huffman coding method, an arithmetic coding method, and a zero tree method.

Preferably, the digital data image is represented in a multidimensional scalar signal.

More preferably, each the vector comprises consecutive values of the digital data.

More preferably, each the vector comprises interleaved values of the digital data.

More preferably, each the vector comprises mixed values of the digital data.

Preferably, the generating is performed according to one member of the group consisting of: indexing the digital data in a consecutive manner, indexing the digital data in an interleaved manner, and indexing the digital data in a mixed manner.

Preferably, the transforming is performed using an analysis multiwavelet filter.

Preferably, the transforming is performed using a synthesis multiwavelet filter.

Preferably, the transforming is performed using a set of biorthogonal multiwavelet filters.

Preferably, the transforming is performed as a recursive forward transform.

According to one aspect of the present invention there is provided an apparatus for compressing digital data. The apparatus comprises an input interface configured for receiving the digital data, a preprocessing module, operatively connected to the input interface, being adapted for generating a vector-valued dataset according to the digital data, a transformation module adapted for transforming the vector-valued dataset into multiwavelet coefficients, and an entropy-coding module adapted for quantifying the multiwavelet coefficients and entropically coding the quantified multiwavelet coefficients.

Preferably, the transformation module is configured for using at least one non-scalar multiwavelet filter during the transforming, the non-scalar multiwavelet filter being defined according to a predefined wavelet filter.

Preferably, the transforming allows the performance of a discrete wavelet transformation.

Preferably, the multiwavelet coefficients are distributed in sub-bands.

Preferably, the transforming is performed using a multiwavelet filter representing an array of functions.

Preferably, by the multiwavelet filter is a member of the following group: an orthogonal multiwavelet filter, a biorthogonal multiwavelet filter, a non-separable filter, a 2D quincunx filter, a hexagonal filter, a 3D FCC filter, 2-band filter, and multi-band filter.

Preferably, the transformation module is configured for reducing the number of significant multiwavelet coefficients.

Preferably, the transformation module is configured for arranging the multiwavelet coefficients as scalar coefficients.

Preferably, the digital data is a member of the group consisting of: an image, a sequence of image, and a video steam.

Preferably, the preprocessing module is configured for converting the color model of the digital data to the YUV color model.

More preferably, the digital data is a sequence of frames represented in the YUV color model, the preprocessing module being configured for partitioning the sequence of frames to Y, U and V group of frames (GOFs), the vector-valued dataset being generated according to each one of the Y, U and V GOFs separately.

Preferably, the vector-valued dataset is a first array having one or more dimensions of second arrays themselves having one or more dimensions, wherein each the second array comprises a vector of values of the digital data.

More preferably, the preprocessing module is configured for adjusting the digital data according to the dimensions of the vector-valued dataset.

Preferably, the transforming is performed according to a multidimensional dyadic separable discrete multiwavelet transform.

Preferably, the digital data image is represented in a multidimensional scalar signal.

Preferably, the preprocessing module is configured for generating the vector-valued dataset according to one of the following: indexing the digital data in a consecutive manner, indexing the digital data in an interleaved manner, and indexing the digital data in a mixed manner.

Preferably, the transforming is performed using a set of refinable vector-valued biorthogonal functions.

Preferably, the apparatus is used for decompressing, the apparatus further comprises a second input interface configured for receiving the encoded digital data, the encoded digital data comprises a set of encoded multiwavelet coefficients, an entropy-decoding module for extracting the encoded multiwavelet coefficients from the encoded digital data, an inverse transformation module for reconstructing a vector-valued dataset from the decoded multiwavelet coefficients, and a post-processing module adapted for producing decoded digital data according to the reconstructed vector-valued dataset.

According to one aspect of the present invention there is provided a method for decompressing encoded digital data. The method comprises: a) receiving the encoded digital data, the encoded digital data comprises a set of encoded multiwavelet coefficients, b) entropically decoding the set of encoded multiwavelet coefficients, c) reconstructing a vector-valued dataset according to the decoded multiwavelet coefficients, d) producing digital data according to the reconstructed vector-valued dataset.

According to one aspect of the present invention there is provided an apparatus for decompressing encoded digital data. The apparatus comprises: an input interface configured for receiving the encoded digital data, the encoded digital data comprising a set of encoded multiwavelet coefficients, an entropy-decoding module for extracting the encoded multiwavelet coefficients from the encoded digital data, an inverse transformation module for reconstructing a vector-valued dataset from the decoded multiwavelet coefficients, and a post-processing module adapted for producing decoded digital data according to the reconstructed vector-valued dataset.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and apparatus of the present invention involves performing or completing certain selected tasks or steps manually, automatically, or a combination thereof. Moreover, according to actual instrumentation and equipment of preferred embodiments of the method and apparatus of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and apparatus of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is an exemplary 2-dimensional image;

FIG. 4 is an exemplary vector-valued dataset that has been generated using a consecutive indexing algorithm. The vector-valued dataset is based on the exemplary 2-dimensional image of the exemplary FIG. 3;

FIG. 5 is an exemplary vector-valued dataset that has been generated using an interleaved indexing algorithm. The vector-valued dataset is based on the exemplary 2-dimensional image of the exemplary FIG. 3;

FIG. 6 is a shuffled version of the exemplary 2-dimensional image of the exemplary FIG. 3 using the parameters $p_x=3$, $n_x=4$, $r_x=2$ and $p_y=5$, $n_y=2$, $r_y=3$;

FIG. 7 is a x-shuffled version of the exemplary 2-dimensional image of FIG. 3 using the parameters $p_x=3$, $n_x=4$, $r_x=2$ and $p_y=5$, $n_y=2$, $r_y=3$;

FIG. 8 is an exemplary vector-valued dataset that has been generated using a mixed indexing algorithm. The vector-valued dataset is based on the exemplary 2-dimensional image of the exemplary FIG. 3;

FIG. 9 is a version of the exemplary 2-dimensional image of FIG. 3 wherein the rows have been cyclically shifted to the left 4 times;

FIG. 10 is an exemplary vector-valued dataset that is computed for the new shifted image. The vector-valued dataset is based on the exemplary 2-dimensional image of the exemplary FIG. 3;

FIG. 11 is an exemplary cyclically top shifted version exemplary image of FIG. 3;

FIG. 12 is a version of the exemplary image of FIG. 3 wherein boundary vectors that have been shifted to the bottom of the original inner cubes of FIG. 3;

DESCRIPTION OF THE PREFERRED EMBODIMENTS

Figure 1:
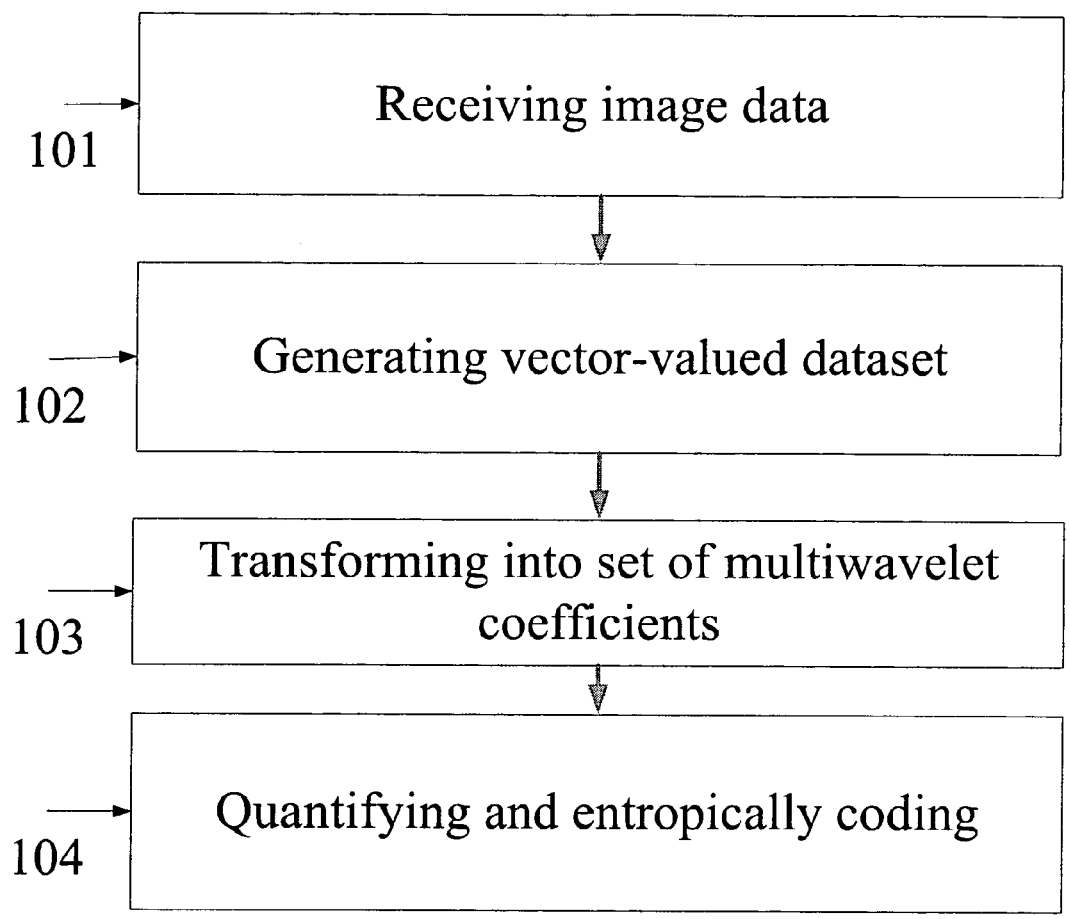
FIG. 1 is a flowchart of an exemplary method for compressing digital data using multiwavelet transformation, according to a preferred embodiment of the present invention.

The present embodiments comprise an apparatus and a method for compressing digital data using multiwavelet transformation. The apparatus and the method are used to construct a vector-valued dataset from the received digital data and to transform the vector-valued dataset to a set of multiwavelet coefficients that can be efficiently encoded. The invention also relates to an apparatus and a method for decompressing digital data using inverse multiwavelet transformation. The apparatus and the method for decompressing digital data are substantially made up of the same functional modules and steps as the apparatus and the method for compressing digital data but functioning in a reverse manner.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

A digital data may be understood as, digital media data, a bitstream, an image, a sequence of images, a text segment, a video stream, an audio stream, a video file, an audio file, a text file, etc.

Reference is now made to FIG. 1, which is a flowchart of an exemplary method for compressing digital data using multiwavelet transformation, according to a preferred embodiment of the present invention.

During the first step, as shown at 101, digital data, is received. Preferably, the digital data is a typical video stream consisting of a sequence of colored frames. In one embodiment of the present invention, each frame has nRows·nCols of pixels and each pixel is represented by a triplet of numbers, a so called color model, such as the red green blue (RGB) color model or the YUV model.

If the YUV color model is used, the Y luminance component suffices to display the original video in grayscale and the U and V components are provided to add colors according to the color spectrum.

In one embodiment of the present invention, if the received digital data is coded by the RGB color model, it is converted to the YUV color model before it is compressed. Such a conversion is important as the YUV color model is considered more useful for compression than RGB for a number of reasons. It is commonly known that human perception is less sensitive to color variations than to luminance variations. Hence, unlike in the compression of data which is represented according to the RGB color model, wherein all the components of the data are evenly compressed, data which is represented by the YUV color model can be compressed more efficiently as the U and V components can be compressed to a much greater level than the Y.

Preferably, digital data that is represented in RGB color model is converted to YUV color model using the following equation:
The $$\begin{pmatrix} Y \\ U \\ V \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} R \\ G \\ B \end{pmatrix}.$$

video sequence of the received digital data is partitioned into cut frames, preferably according to the Y grayscale video representation frames.

The partition of the Y frames is preferably made according to variations between the frames. The U and V frames are preferably partitioned into respective cuts. Preferably, each one of the Y, U or V group of frames (GOFs) is processed independently in a manner that allows a separate compression thereof.

Then, as shown at 102, a vector-valued dataset is generated according to the digital data. It should be noted that the vector-valued dataset may be generated according to one or more of the Y, U and V GOFs. Preferably, the vector-valued dataset is based only on the Y GOF, only on the Y GOF and the U GOF or V GOF, or sequentially on all the GOFs. The digital data is a multidimensional scalar signal and the vector-valued dataset that is generated based thereupon is a multidimensional vector-valued signal. As further described below, the multidimensional vector-valued signal is preferably generated according to one or more indexing algorithms such as a consecutive indexing algorithm, an interleaved indexing algorithm, or a combination thereof, which may be understood as the mixed indexing method.

In one embodiment of the present invention, each GOF is compressed separately. In particular, a given GOF, with $N_1$ frames, $N_2$ rows and $N_3$ columns, is transformed into the new vector-valued dataset using the following parameters:

$$N_k = p_k n_k r_k; n_k = 2^{l_k}, k=1,2,3, r=r_1 \times r_2 \times r_3.$$

where $p_k$ denotes outer cube dimensions, $n_k$ denotes inner cubes dimensions, $l_k$ denotes inner cubes levels, and $r_k$ denotes multiwavelet dimensions, to satisfy these conditions and provide for the best compression and performance. In such an embodiment, the GOF dimensions may be readjusted, preferably by duplicating the last frame of the GOF or by chopping the frames boundaries to adjust for the frame dimensions.

The vector-valued dataset is adapted to be used by multiwavelet algorithms. During the following step, as shown at 103, the vector-valued dataset is transformed into a set of multiwavelet coefficients.

The multiwavelet transformation is a generalization of a wavelet transformation to vector-valued signals. In essence, the multiwavelet transform can pertain to one dimensional or multidimensional multiwavelet functions, to orthogonal and biorthogonal multiwavelet filters and to separable, and non-separable i.e., 2D Quincunx and Hexagonal subsampling lattices, 3D FCC sub-sampling lattice etc. Moreover, the multiwavelet filter may be 2-band or M-band filter, and the transform steps may comprise a dyadic or any other possible packet transform sequence. In particular, the multiwavelet transformation that is used in this step is based on a set of algorithms for a 2-band multidimensional dyadic separable discrete multiwavelet transform, which may be referred to as a multidimensional discrete multiwavelet transform (DMWT).

During the following step, as shown at step 104, the multiwavelet coefficients are quantified and processed according to a certain entropically coding. The entropy coding stage is where actual compression and scalable transmission occur. Entropy coding is done by standard algorithms for entropy and wavelet coding such as, scalar and vector quantization methods, Huffman and arithmetic coding methods, and zero tree methods, see, inter alia, Allen Gersho et al., Vector quantization and signal compression, Kluwer Academic Publishers, 1992; Sayood Khalid, Introduction to Data Compression, Morgan Kaufmann, 2000; Jerome M. Shapiro, Embedded image coding using zero trees of wavelet coefficients, IEEE Transactions on Image Processing, 41(12):3445-3462, 1993; and Amir Said et. al, A new, fast, and efficient image codec based on set partitioning in hierarchical trees, IEEE Trans. on Circ. and Syst. for Video Tech., 6(3):243-250, 1996 which are herein incorporated in their entirety by reference into the specification. The implementation of such entropy coding methods is generally well known and therefore is not described here in greater detail.

Figure 2:
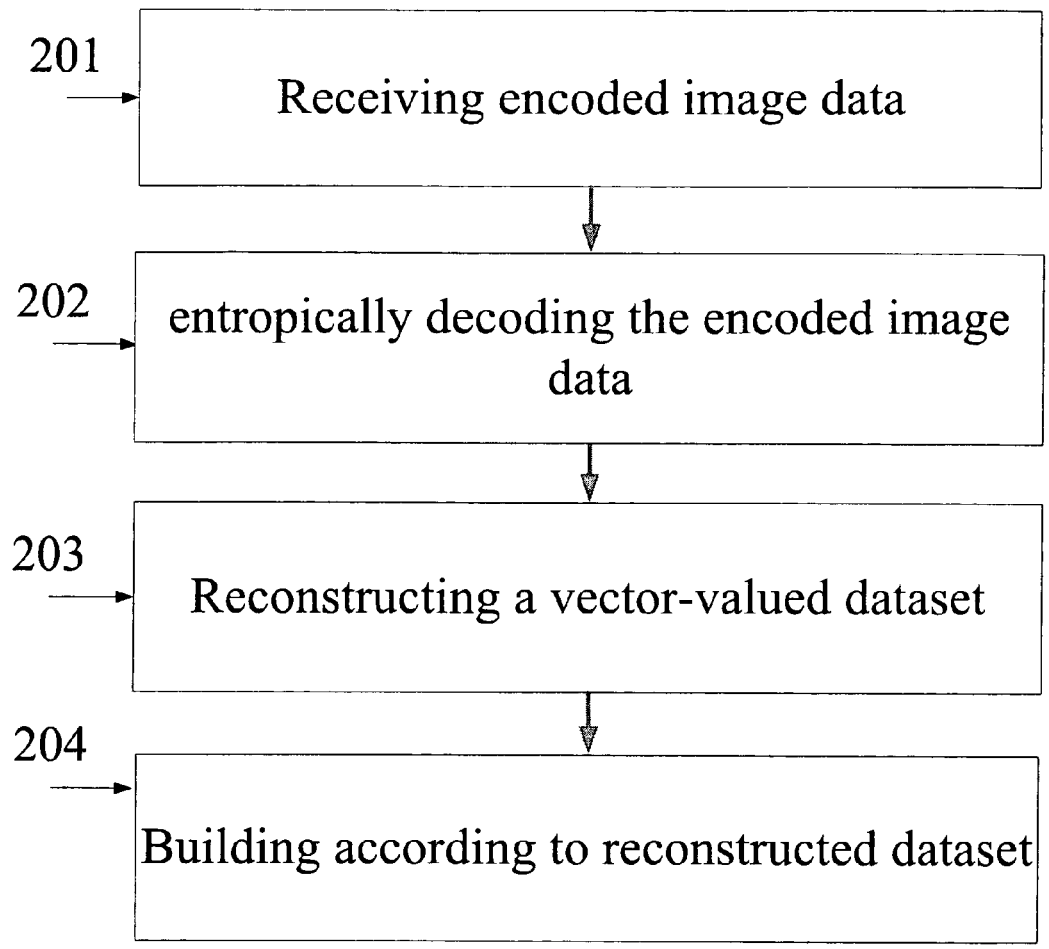
FIG. 2 is a flowchart of an exemplary method for decompressing digital data using multiwavelet transformation, according to a preferred embodiment of the present invention.

Reference is now made to FIG. 2, which is a flowchart of an exemplary method for decompressing digital data that has been compressed using multiwavelet transformation, according to a preferred embodiment of the present invention. The method, which is depicted in FIG. 2, is used for decompressing encoded digital data that has been generated using multiwavelet transformation.

During the first step, as shown at 201, the encoded digital data is received. Then, as shown at 202, the encoded digital data is entropically decoded into a set of multiwavelet coefficients. The implementation of such entropy decoding is generally well known and therefore is not described here in greater detail.

During the following step, as shown at 203, the set of multiwavelet coefficients is used for reconstructing the GOF that comprises the digital data. The reconstruction is based on an inverse multiwavelet transformation, which may be referred to as a multidimensional inverse discrete multiwavelet transform (IDMWT).

The implementation of the IDMWT is based on the used DMWT that is described in detail below. In the following step, as shown at 204, the raw video data is built from the reconstructed GOF. Preferably, a number of GOFs are used for generating an original video structure, which is preferably a YUV video structure. Preferably, if the original video structure has been represented in RGB color model the reconstructed digital dataset can be converted to RGB color model, preferably using the following equation:

$$\begin{pmatrix} R \\ G \\ B \end{pmatrix} = \begin{pmatrix} 1.0 & 0.0 & 1.140 \\ 1.0 & -0.395 & -0.581 \\ 1.0 & 2.032 & 0.0 \end{pmatrix} \begin{pmatrix} Y \\ U \\ V \end{pmatrix},$$

Reference is now made, once again, to FIG. 1. In the following section, a detailed description of a method for transforming a multidimensional scalar signal into a multidimensional vector-valued signal is provided. Such method can be used for generating a vector-valued dataset according to digital data such as an image, a video stream, an audio stream, a sequence of images etc.

In order to clarify the transformation method a number of notations are explained hereinbelow.

$\mathcal{R}$ denotes a set of real scalar numbers, $\mathcal{R}^N$ denotes a set of real vectors of order N, $\mathcal{R}^{(N_1 \ldots N_k)}$ denotes a set of multidimensional vectors of order $N_1 \cdot \ldots \cdot N_K$, and $S^{(i_{N1}, \ldots, i_{NK})}$ denote a set of numbers of $\mathcal{R}$.

For example, $\mathcal{R}^{(N_1 \ldots N_k)}$ denotes a set of 2-dimensional images of order $N_1 \times N_2$. When the input is a multidimensional scalar signal, as described above, of order $N_1 \cdot \ldots \cdot N_K$ for $s(i_{N1}, \ldots, i_{NK})$, the following equation holds:

$$S^{(N_1, \ldots, N_K)} = \left( s(i_{N_1}, \ldots, i_{N_K}) \in \mathcal{R}, \begin{array}{c} 0 \le i_{N_k} < N_k \\ 1 \le k \le K \end{array} \right), \quad (2.1)$$

for example, the received multidimensional scalar signal is a 3-dimensional signal that represents one or more GOFs.

Reference is now made to FIG. 3, which is an exemplary 2-dimensional image that is received, indexed, and transformed, as described below. The image depicted in FIG. 3 is exemplary image only and does not limit the transformation and indexing methods, which are, described hereinbelow. The generalization to the multidimensional image from the exemplary 2-dimensional image is straightforward and therefore is not described herein in further detail.

Given a multidimensional signal with dimensions $N_k$, $\{k=1, \ldots, K\}$, we define a set of non-negative integers $l_k$, and a set of positive integers $p_k$, $n_k$ and r, such that the following equations hold:

$$N_k = p_k n_k r_k n_k = 2^{l_k}, k=1, \ldots, K,$$

$$r = r_1 \times \ldots \times r_K. \quad (2.2)$$

where the new multidimensional data structure is defined as a multidimensional outer cube of multidimensional inner cubes of vectors, $p_k$ denotes the outer dimensions cube of the multidimensional cube, $n_k$ denotes the inner dimensions of the multidimensional cube, $l_k$ denotes the respective inner levels of the multidimensional cube, and $r_k$ denotes the dimensions of the multiwavelet order r.

Based on the aforementioned notations, we can represent the new vector-valued dataset as follows:

A multidimensional cube of order $p_1 \cdot \ldots \cdot p_K$ defined as follows:

$$O^{(p_1, \ldots, p_K)} = \qquad (2.3)$$

$$\left( C_{i_{p_1}, \ldots, i_{p_K}}^{(n_1, \ldots, n_K)} \in \mathcal{R}^{(n_1, \ldots, n_K, r)}, \begin{array}{c} 0 \le i_{p_k} < p_k \\ 1 \le k \le K \end{array} \right).$$

where the multidimensional inner cubes, of orders $n_1 \cdot n_2 \cdot \ldots \cdot n_K$, is denoted by:

$$C_{i_{p_1}, \ldots, i_{p_K}}^{(n_2, \ldots, n_K)} = \left( V_{i_{p_1}, \ldots, i_{p_K}, i_{n_1}, \ldots, i_{n_K}}^{(r)} \in \mathcal{R}^r, \begin{array}{c} 0 \le i_{n_k} < n_k \\ 1 \le k \le K \end{array} \right). \quad (2.4)$$

and the vectors as follows:

$$V_{i_{p_1}, \ldots, i_{p_K}, i_{n_1}, \ldots, i_{n_K}}^{(r)} = \left( v_{i_{p_1}, \ldots, i_{p_K}, i_{n_1}, \ldots, i_{n_K}}(i_r) \in \mathcal{R}, 0 \le i_r < r \right). \quad (2.5)$$

of order $r = r_1 \cdot r_2 \cdot \ldots \cdot r_K$.

As described below, the multiwavelet algorithms, which are used during the multiwavelet transformation, operate on vector-valued coefficients, which may be referred to as the multiwavelet coefficients. The vector-valued dataset that is defined by equations (2.3), (2.4), and (2.5) can be used by such multiwavelet algorithms.

The vector-valued dataset is preferably generated according to one or more indexing methods. The following sections describe three possible indexing methods, which are preferably used for generating the vector-valued dataset.

Consecutive Indexing

In one embodiment of the present invention, the received vector-valued dataset is indexed according to a consecutive indexing algorithm. In consecutive indexing, the vectors of the vector-valued dataset, which are described in equation (2.5), are generated by accumulating respective consecutive coefficients from respective given directions. In order to clarify the embodiment, an exemplary consecutive indexing of a 1-dimensional scalar signal is provided in the following section.

A one-dimensional scalar signal of order $N = p \cdot n \cdot r$ is received. The one-dimensional scalar signal is defined as follows:

$$S^{(N)} = (s(i_N) \in \mathcal{R}, 0 \le i_N < N), \quad (2.6)$$

According to the aforementioned notations and the equations (2.3), (2.4), and (2.5), a new vector-valued dataset that is a 1-dimensional cube is defined as follows:

$$O^{(p)} = (C_{i_p}^{(n)} \in \mathcal{R}^{(n,r)}, 0 \le i_p < p), \quad (2.7)$$

where the order is p. The one-dimensional inner cubes are defined as follows:

$$C_{i_p}^{(n)} = (V_{i_p, i_n}^{(r)} \in \mathcal{R}^r, 0 \le i_n < n), \quad (2.8)$$

where the order is n. The vectors are defined as follows:

$$V_{i_p, i_n}^{(r)} = (v_{i_p, i_n}(i_r) \in \mathcal{R}, 0 \le i_r < r), \quad (2.9)$$

where the order is r. During the consecutive indexing process, the new vectors in (2.9) are generated by combining the respective r consecutive coefficients from (2.6), preferably as follows:

$$V_{i_p,i_n}^{(r)} = \begin{pmatrix} s(i) \\ s(i+1) \\ \vdots \\ s(i+r-1) \end{pmatrix} i = i_p * (n*r) + i_n * r, \quad (2.10)$$

$$0 \le i_n < n,$$

$$0 \le i_p < p,$$

For example, is the one-dimensional scalar signal is defined as follows:

$$S^{(36)} = \{0,1,2,3,\ldots,32,33,34,35\}, \quad (2.11)$$

where 35 N=36,
p=3, n=4, and r=3, the following cubic data structure is received:

$$O^{(3)} = \left(\left(\left(\begin{smallmatrix}0\\1\\2\end{smallmatrix}\right)\left(\begin{smallmatrix}3\\4\\5\end{smallmatrix}\right)\left(\begin{smallmatrix}6\\7\\8\end{smallmatrix}\right)\left(\begin{smallmatrix}9\\10\\11\end{smallmatrix}\right)\right)\left(\left(\begin{smallmatrix}12\\13\\14\end{smallmatrix}\right)\left(\begin{smallmatrix}15\\16\\17\end{smallmatrix}\right)\left(\begin{smallmatrix}18\\19\\20\end{smallmatrix}\right)\left(\begin{smallmatrix}21\\22\\23\end{smallmatrix}\right)\right)\left(\left(\begin{smallmatrix}24\\25\\26\end{smallmatrix}\right)\left(\begin{smallmatrix}27\\28\\29\end{smallmatrix}\right)\left(\begin{smallmatrix}30\\31\\32\end{smallmatrix}\right)\left(\begin{smallmatrix}33\\34\\35\end{smallmatrix}\right)\right)\right)$$

Now, a 2-dimensional scalar signal is assumed. The 2-dimensional scalar signal is preferably defined as follows:

$$S^{(N_1,N_2)} = (s(i_{N_1},i_{N_2})) \in \mathcal{R}, 0 \le i_{N_1} < N_1, 0 \le i_{N_2} < N_2), \quad (2.12)$$

where:

$$N_1 = p_1 \times n_1 \times r_1, N_2 p_2 \times n_2 \times r_2, r = r_1 \times r_2 \quad (2.13)$$

The respective rows of $S^{(N_1,N_2)}$ can now be defined as follows:

$$S_{i_{N_1}}^{(N_2)} = (s(i_{N_1},i) \in \mathcal{R}, 0 \le i < N_2), 0 \le i_{N_1} < N_1. \quad (2.14)$$

Such row definition allows the decomposing of the row signals into the respective new 1-dimensional cubic data structures as described above in relation to equations (2.7), (2.8), and (2.9) for the 1-dimensional scalar signal above. Namely, for each one of the aforementioned rows a respective new cubic data structure is received, preferably as follows:

$$O_{i_{N_1}}^{(p_2)} = \left(C_{i_{N_1},i_{p_2}}^{(n_2)} \in \mathcal{R}^{(n_2,r_2)}, 0 \le i_{p_2} < p_2\right), \quad (2.15)$$

where the order is $p_2$. The one-dimensional inner cubes are defined as follows:

$$C_{i_{N_1},i_{p_2}}^{(n_2)} = \left(V_{i_{N_1},i_{p_2},i_{n_2}}^{(r_2)} \in \mathcal{R}^{r_2}, 0 \le i_{n_2} < n_2\right) \quad (2.16)$$

where the order is $n_2$. The vectors are defined as follows:

$$V_{i_{N_1},i_{p_2},i_{n_2}}^{(r_2)} = \left(v_{i_{N_1},i_{p_2},i_{n_2}}(i_{r_2}) \in \mathcal{R}, 0 \le i_{r_2} < r_2\right), \quad (2.17)$$

where the order is $r_2$ and $V_{i_{N_1},i_{p_2},i_{p_2}}$ is defined as in (2.10), preferably as follows:

$$V_{i_{N_1},i_{p_2},i_{n_2}}^{(r_2)} = \begin{pmatrix} s(i_{N_1},i) \\ s(i_{N_1},i+1) \\ \vdots \\ s(i_{N_1},i+r_2-1) \end{pmatrix}, \quad (2.18)$$

$$i = i_{p_2} * (n_2 * r_2) + i_{n_2} * r_2,$$

$$0 \le i_{n_2} < n_2,$$

$$0 \le i_{p_2} < p_2.$$

The respective new two-dimensional cubic data structure, of the original image in (2.12), is then given, using again the notations of Section 2.1, as follows:

$$O^{(p_1,p_2)} = \left(C_{i_{p_1},i_{p_2}}^{(n_1,n_2)} \in \mathcal{R}^{(n_1,n_2,r)}, 0 \le i_{p_1} < p_1, 0 \le i_{p_2} < p_2\right), \quad (2.19)$$

where the order is $p_1 \times p_2$. The two-dimensional inner cubes are defined as follows:

$$C_{i_{p_1},i_{p_2}}^{(n_1,n_2)} = \left(V_{i_{p_1},i_{p_2},i_{n_1},i_{n_2}}^{(r)} \in \mathcal{R}^r, 0 \le i_{n_1} < n_1, 0 \le i_{n_2} < n_2\right), \quad (2.20)$$

where the order is $n_1 \times n_2$. The $n_1 \times n_2$ vectors are defined as follows:

$$V_{i_{p_1},i_{p_2},i_{n_1},i_{n_2}}^{(r)} = \left(v_{i_{p_1},i_{p_2},i_{n_1},i_{n_2}}(i_r) \in \mathcal{R}, 0 \le i_r < r\right), \quad (2.21)$$

where the order is r. To construct these new vectors the respective $r_1$ consecutive row vectors of (2.18) is similarly combined, for example, as follows:

$$V_{i_{p_1},i_{p_2},i_{n_1},i_{n_2}}^{(r)} = \begin{pmatrix} V_{i,i_{p_2},i_{n_2}}^{(r_2)} \\ V_{i+1,i_{p_2},i_{n_2}}^{(r_2)} \\ \vdots \\ V_{i+r_1-1,i_{p_2},i_{n_2}}^{(r_2)} \end{pmatrix}, \quad (2.22)$$

$$i = i_{p_1} * (n_1 * r_1) + i_{n_1} * r_1,$$

$$0 \le i_{n_1} < n_1,$$

$$0 \le i_{p_1} < p_1,$$

where the order is $r = r_1 \times r_2$ as required.

Reference is now made to FIG. 4, which is an exemplary vector-valued dataset that has been generated using the consecutive indexing. The vector-valued dataset is based on the exemplary 2-dimensional image of FIG. 3. The vector-valued dataset is based on the following parameters:

$$N_x = 24, p_x = 3, n_x = 4, r_x = 2,$$

$$N_y = 30, p_y = 5, n_y = 2, r_y = 3. \quad (2.23)$$

Therefore, the outer cube is of dimensions 5·3, the inner cubes are of dimensions 2·4, and the multiwavelet order is r=3·2.

The algorithm for generating of multidimensional vector-valued dataset according to a multidimensional scalar signal can be easily acquired, using induction, as follows:

The induction is based on the assumption that the initial scalar signal is defined according to (2.1) and the input parameters are as in (2.2). Based thereupon, the (k−1)-dimensional row signal of (2.1) is similar to the rows of (2.14) and therefore defined as follows:

$$S_{i_{N_1}}^{(N_2,\ldots,N_K)} = \left(s(i_{N_1}, i_{N_2}, \ldots, i_{N_K}) \in \mathcal{R}, \begin{array}{c} 0 \le i_{N_k} < N_k \\ 2 \le k \le K \end{array}\right), \quad (2.24)$$

for $0 \le i_{N_1} < N_1$.

Then, by assumption, for each such row we have the respective cubic data structure of:

A (K−1)-dimensional outer cube, such as:

$$O_{i_{N_1}}^{(p_2,\ldots,p_K)} = \left(C_{i_{N_1}, i_{p_2},\ldots,i_{p_K}}^{(n_2,\ldots,n_K)} \in \mathcal{R}^{(n_2,\ldots,n_K,r')}, \begin{array}{c} 0 \le i_{p_k} < p_k \\ 2 \le k \le K \end{array}\right), \quad (2.25)$$

for $r' = r_2 \cdot r_3 \cdots r_K$, where the order is $p_2 \cdots p_K$. The (K−1)-dimensional inner cubes are defined preferably as follows:

$$C_{i_{N_1}, i_{p_2},\ldots,i_{p_K}}^{(n_2,\ldots,n_K)} = \left(V_{i_{N_1}, i_{p_2},\ldots,i_{p_K}, i_{n_2},\ldots,i_{n_K}}^{(r')} \in \mathcal{R}^{r'}, \begin{array}{c} 0 \le i_{n_k} < n_k \\ 2 \le k \le K \end{array}\right), \quad (2.26)$$

where the order is $n_2 n_3 \cdots n_K$. The vectors are defined preferably as follows:

$$V_{i_{N_1}, i_{p_2},\ldots,i_{p_K}, i_{n_2},\ldots,i_{n_K}}^{(r')} = \left(v_{i_{N_1}, i_{p_2},\ldots,i_{p_K}, i_{n_2},\ldots,i_{n_K}}(i_{r'}) \in \mathcal{R}, 0 \le i_{r'} < r'\right), \quad (2.27)$$

where the order is $r' = r_2 \cdot r_3 \cdots r_K$.

Now it is assumed that the new multidimensional cubic data structure is defined as in (2.3)-(2.5). In order to construct the new vectors in (2.5) the following is calculated, similarly to (2.22) above. Namely, the respective $r_1$ consecutive row vectors of (2.27) are combined into the newly generated vectors as follows:

$$V_{i_{p_1},\ldots,i_{p_K}, i_{n_1},\ldots,i_{n_K}}^{(r)} = \begin{pmatrix} V_{i, i_{p_2},\ldots,i_{p_K}, i_{n_2},\ldots,i_{n_K}}^{(r')} \\ V_{i+1, i_{p_2},\ldots,i_{p_K}, i_{n_2},\ldots,i_{n_K}}^{(r')} \\ \vdots \\ V_{i+r_1-1, i_{p_2},\ldots,i_{p_K}, i_{n_2},\ldots,i_{n_K}}^{(r')} \end{pmatrix}, \quad (2.28)$$

$i = i_{p_1} * (n_1 * r_1) + i_{n_1} * r_1,$ $0 \le i_{n_1} < n_1,$ $0 \le i_{p_1} < p_1,$ where the order is r, as required.

Interleaved Indexing

In another embodiment of the present invention, the vector-valued dataset is indexed according to an interleaved indexing algorithm. In the interleaved indexing algorithm, similarly to the cumulative indexing, the respective interleaved coefficients are accumulated from the respective given directions.

In the following section, the interleaved indexing algorithm is presented on a 1-dimensional signal for clarity. Such a presentation is not limiting as the interleaved indexing algorithm can be used for any multidimensional signal.

The 1-dimensional signal is defined, as in (2.6), with N=p·n·r. Thus, the new cubic data structure is as defined in (2.7)-(2.9). Then, the new vectors of (2.9) can be constructed by combining the respective r interleaved coefficients from (2.6), for example, as follows:

$$V_{i_p, i_n}^{(r)} = \begin{pmatrix} s(i) \\ s(i+n) \\ \vdots \\ s(i+(r-1)*n) \end{pmatrix}, \quad (2.29)$$

$i = i_p * (n * r) + i_n,$ $0 \le i_n < n,$ $0 \le i_p < p,$ instead of as in (2.10) above. It should be noted that the original coefficients are now interleaved, in gaps of order n, instead of consecutively before.

For example, consider again the 1-dimensional signal in (2.11), with p=3, n=4, r=3 as described above. Then, the new interleaved cubic data structure is defined as follows:

$$O^{(3)} = \left(\left(\begin{pmatrix}0\\4\\8\end{pmatrix}\begin{pmatrix}1\\5\\9\end{pmatrix}\begin{pmatrix}2\\6\\10\end{pmatrix}\begin{pmatrix}3\\7\\11\end{pmatrix}\right)\right. \quad (2.30)$$

$$\left.\left(\begin{pmatrix}12\\16\\20\end{pmatrix}\begin{pmatrix}13\\17\\21\end{pmatrix}\begin{pmatrix}14\\18\\22\end{pmatrix}\begin{pmatrix}15\\19\\23\end{pmatrix}\right)\left(\begin{pmatrix}24\\28\\32\end{pmatrix}\begin{pmatrix}25\\29\\33\end{pmatrix}\begin{pmatrix}26\\30\\34\end{pmatrix}\begin{pmatrix}27\\31\\35\end{pmatrix}\right)\right).$$

A 2-dimensional case follows such a 1-dimensional case, similarly as defined before. The signal is defined as in (2.12), with parameters as in (2.13), we let the respective rows be as in (2.14). Then, to decompose these row signals, we now use similarly the interleaved cubic data structure as above. Namely, respective 1-dimensional cubic data structures are constructed as defined in (2.15), (2.16), and (2.17) using:

$$V_{i_{N_1}, i_{p_2}, i_{n_2}}^{(r_2)} = \begin{pmatrix} s(i_{N_1}, i) \\ s(i_{N_1}, i+n_2) \\ \vdots \\ s(i_{N_1}, i+(r_2-1)*n_2) \end{pmatrix}, \quad (2.31)$$

$i = i_{p_2} * (n_2 * r_2) + i_{n_2},$ $0 \le i_{n_2} < n_2,$ $0 \le i_{p_2} < p_2,$ instead of as defined in (2.18) above. Based thereupon, the new 2-dimensional cubic data structure is defined as in (2.19), (2.20), and (2.21). In order to construct the new vectors, as in (2.21), interleaved indexing is used as done above, instead of consecutive indexing, as done before. Namely, we now combine the respective $r_1$ interleaved row vectors of (2.31), for example, as follows:

$$V_{i_{p_1},i_{p_2},i_{n_1},i_{n_2}}^{(r)} = \begin{pmatrix} V_{i,i_{p_2},i_{n_2}}^{(r_2)} \\ V_{i+n_1,i_{p_2},i_{n_2}}^{(r_2)} \\ \vdots \\ V_{i+(r_1-1)*n_1,i_{p_2},i_{n_2}}^{(r_2)} \end{pmatrix},$$

$$i = i_{p_1} * (n_1 * r_1) + i_{n_1},$$

$$0 \leq i_{n_1} < n_1,$$

$$0 \leq i_{p_1} < p_1,$$

instead of as defined in (2.22) before.

For example, a cubic data structure for the image example of FIG. 3 with the parameters (2.23) is displayed in FIG. 5. It should be noted how the original signal coefficients are now interleaved in the new vector-valued coefficients. The general case then follows similarly by induction. For the multidimensional scalar signal (2.1) and the same parameters (2.2), a respective (K−1)-dimensional row signals is defined as in (2.24). Then, it can be assumed by induction that for each such row signal we have the respective cubic data structure as in (2.25), (2.26), and (2.27). Then, based on the new multidimensional cubic data structure that is preferably defined as in (2.3), (2.4), and (2.5) the new vectors (2.5) can be constructed using the interleaved indexing instead of consecutive indexing as above. Namely, we combine the respective $r_1$ interleaved vectors, as in (2.27), into the newly generated vectors, for example, as follows:

$$V_{i_{p_1},\ldots,i_{p_K},i_{n_1},\ldots,i_{n_K}}^{(r)} = \begin{pmatrix} V_{i,i_{p_2},\ldots,i_{p_K},i_{n_2},\ldots,i_{n_K}}^{(r')} \\ V_{i+n_1,i_{p_2},\ldots,i_{p_K},i_{n_2},\ldots,i_{n_K}}^{(r')} \\ \vdots \\ V_{i+(r_1-1)*n_1,i_{p_2},\ldots,i_{p_K},i_{n_2},\ldots,i_{n_K}}^{(r')} \end{pmatrix},$$

$$i = i_{p_1} * (n_1 * r_1) + i_{n_1},$$

$$0 \leq i_{n_1} < n_1,$$

$$0 \leq i_{p_1} < p_1,$$

instead of as in (2.28) hereinabove.

Mixed Indexing

In mixed indexing, respective coefficients are accumulated from respective given directions using mixed indexing strategies. In this section, only one mixed indexing strategy that combines either consecutive or interleaved indexing for each direction is used. However, it should be noted that more complicated techniques, preferably of similar combinations, may also be used.

The method of mixed indexing uses either the consecutive indexing or interleaved indexing method in each given direction. The mixed indexing algorithm may therefore be similarly devised as the consecutive and interleaved algorithms of the previous sections.

In one preferred embodiment of the present invention, a more straightforward approach may be used during the mixed indexing.

In such an embodiment, the 1-dimensional signal SN is defined as in (2.6), and N=p·n·r as described above. The respective shuffled scalar signal is defined as follows:

$$T^{(N)} = (t(i_N) \in R, 0 \leq i_N < N),$$

$$t(i_p*(n*r) + i_n*r + i_r) = s(i_p*(n*r) + i_n + i_r*n),$$

where $0 \leq i_p < p$, $0 \leq i_n < n$, $0 \leq i_r < r$.

Then, obviously, applying the aforementioned consecutive indexing algorithm on $T^{(N)}$ results in the same cubic data structure as with the aforementioned interleaved indexing algorithm and $S^{(N)}$, for example using (2.10) with $T^{(N)}$ provides the same data structure as using (2.29) with $S^{(N)}$. For example, the 1-dimensional signal of (2.11) with the same parameters is shuffled to generate the following:

(0 4 8 1 5 9 2 6 10 3 7 11 12 16 20 13 17 21 14 18 22 15 19 23 24 28 32 25 29 33 26 30 34 27 31 35).

Figure 6:
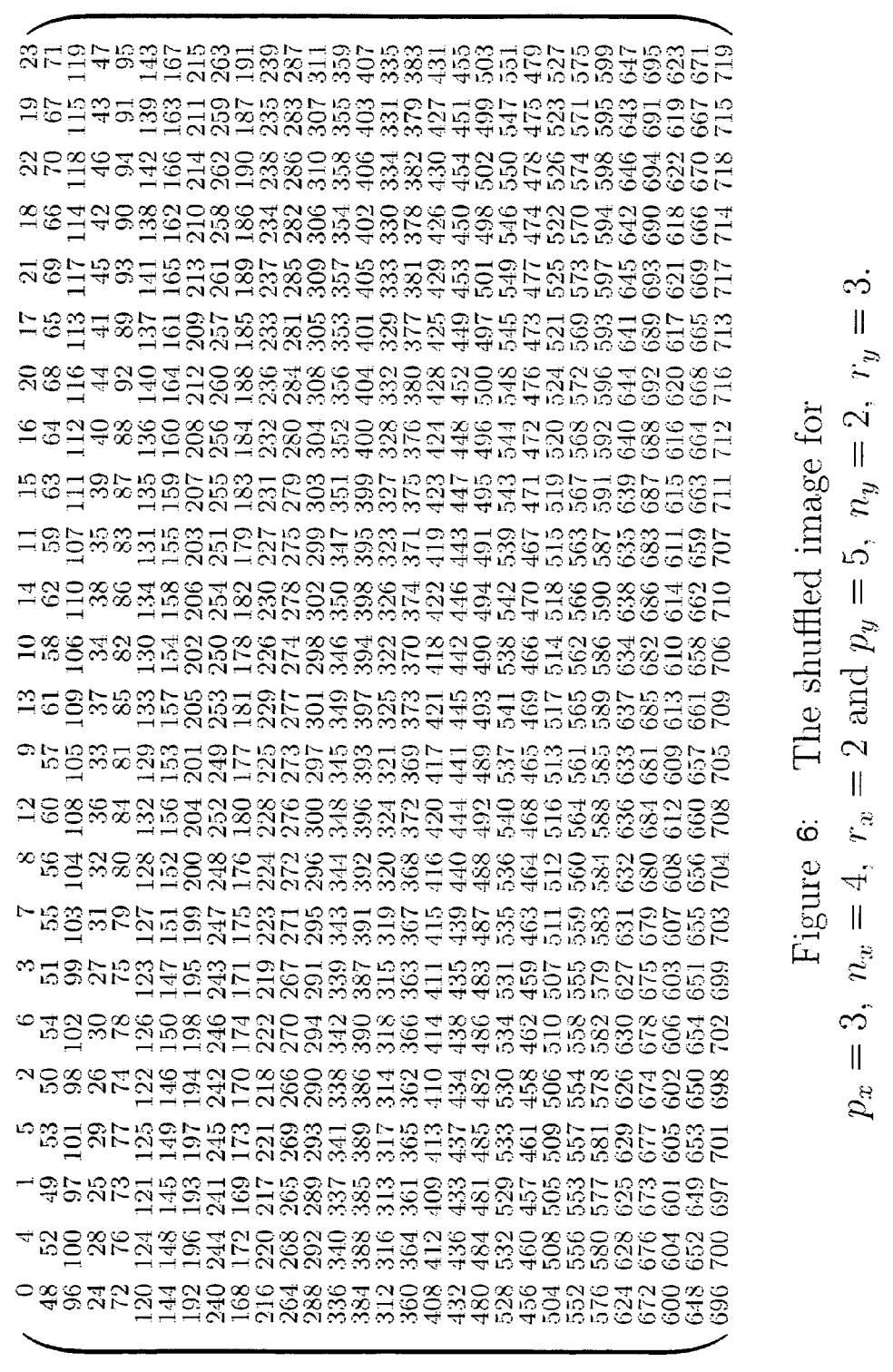

Obviously, the result of applying the aforementioned consecutive indexing algorithm on such a signal is equal to the same cubic data structure as defined in (2.30). In the manner, we implement a multidimensional interleaved indexing method by first shuffling the respective 1-dimensional row signals in each direction, and then using the aforementioned consecutive indexing algorithm. For example, the image of FIG. 3, with the parameters (2.23), produces the shuffled image that is given in FIG. 6. The resulting 2-dimensional cubic data structure, after application of the aforementioned consecutive algorithm, would then be the same as in FIG. 5.

When mixed indexing is applied, interleaving in a given direction can be understood as shuffling in the same direction, while otherwise nothing has to be done. Then we apply the aforementioned consecutive algorithm to the transformed signal to yield a corresponding new cubic data structure.

Figure 7:
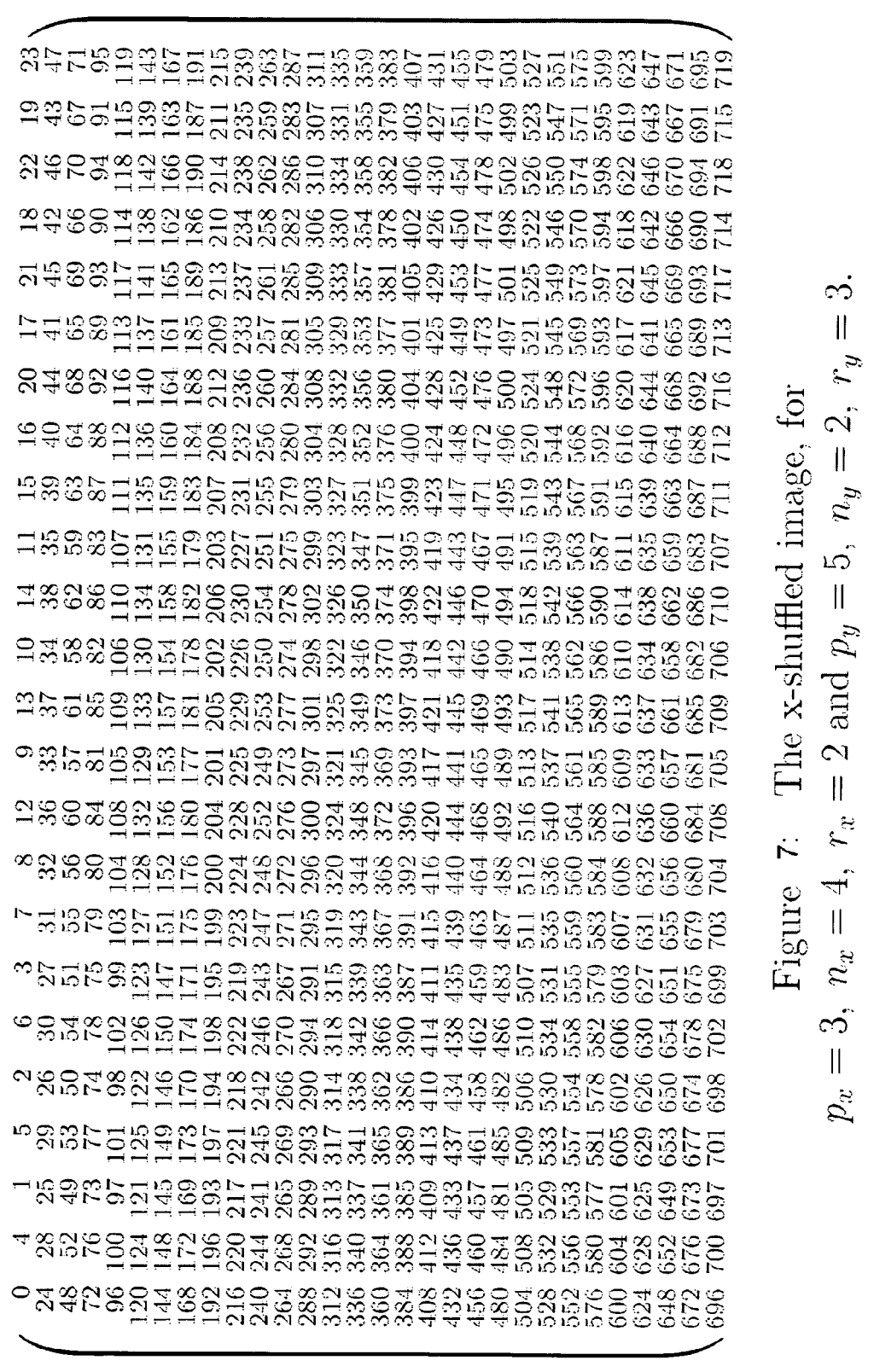

In one example, the image of FIG. 3, with the parameters (2.23), is indexed using interleaved indexing on the x-direction and consecutive indexing on the y-direction. Such an indexing provides the partially shuffled image that is shown at FIG. 7. The new 2-dimensional cubic data structure, resulting from this application of the consecutive algorithm, is shown in FIG. 8. It should be noted that the multidimensional case may be easily generated in the same manner.

Reference is now made, once again to FIG. 1. As described above, after a vector-valued dataset is generated, the vector-valued dataset is transformed into a set of multiwavelet coefficients according to one or more multiwavelet transformation algorithms. The following section provides a description of a multidimensional multiwavelet transformation that is based on a vector-valued dataset that has been defined as the aforementioned generic data structure.

In particular, following section describes novel algorithms for a multidimensional dyadic separable discrete multiwavelet transform, which may be referred to as a multidimensional DMWT.

A discrete multiwavelet transform is a generalization of the wavelet transform that is described in the background section in the sense that vector-valued refinable functions, filter matrix coefficients, and matrix vector operations are used, as described below. The transform order is denoted as $r \geq 1$ where $r=1$ is the simple case of the wavelet transform.

For clarity, the following vector notations are used to define the multiwavelet transform:

$\tilde{\Phi}(x)$ denotes an analysis scaling function, $\Phi(x)$ denotes a synthesis scaling function. $\tilde{\Phi}(x)$ and $\Phi(x)$ are preferably defined as follows:

$$\tilde{\Phi}(x) = \begin{pmatrix} \tilde{\phi}_1(x) \\ \vdots \\ \tilde{\phi}_r(x) \end{pmatrix} \in \mathcal{R}^r,$$

$$\Phi(x) = \begin{pmatrix} \phi_1(x) \\ \vdots \\ \phi_r(x) \end{pmatrix} \in \mathcal{R}^r,$$

for given sets of r scalar functions, for example as:

$$\tilde{\phi}_i(\chi), \Phi_i(\chi) \in R, i=1, \ldots, r.$$

In the same manner, we denote the analysis and synthesis wavelet functions by $\tilde{\psi}(x)$ and $\psi(x)$, which are preferably defined as follows:

$$\tilde{\Psi}(x) = \begin{pmatrix} \tilde{\psi}_1(x) \\ \vdots \\ \tilde{\psi}_r(x) \end{pmatrix} \in \mathcal{R}^r,$$

$$\Psi(x) = \begin{pmatrix} \psi_1(x) \\ \vdots \\ \psi_r(x) \end{pmatrix} \in \mathcal{R}^r,$$

for other sets of r scalar functions, such as:

$$\tilde{\psi}_i(\chi), \psi_i(\chi) \in R, i=1, \ldots, r.$$

The respective scaling vector-valued re-finable equations are then given by:

$$\tilde{\Phi}(x) = \sqrt{2} \sum_k \tilde{H}_k \tilde{\Phi}(2x-k), \Phi(x) = \sqrt{2} \sum_k H_k \Phi(2x-k), \quad (3.6)$$

for given sets of matrix coefficients $\{\tilde{H}_k \in M^r\}$ and $\{H_k \in M^r\}$. In the same manner, the respective wavelet vector-valued re-finable equations are:

$$\tilde{\Psi}(x) = \sqrt{2} \sum_k \tilde{G}_k \tilde{\Psi}(2x-k), \Psi(x) = \sqrt{2} \sum_k G_k \Psi(2x-k), \quad (3.7)$$

for given sets of matrix coefficients $\{\tilde{G}_k \in M^r\}$ and $\{G_k \in M^r\}$.

Biorthogonality of these respective re-finable functions is then implied, as with equation (3.3) from the background section, under the following matrix conditions:

$$\sum_k H_k \tilde{H}_{k-2l} = \sum_k G_k \tilde{G}_{k-2l} = \delta_l I_r = \sum_k \tilde{G}_k G_{k-2l} = \sum_k \tilde{H}_k H_{k-2l}, \quad (3.8)$$

$$\sum_k H_k \tilde{G}_{k-2l} = \sum_k G_k \tilde{H}_{k-2l} = 0_r = \sum_k \tilde{G}_k H_{k-2l} = \sum_k \tilde{H}_k G_{k-2l},$$

where $I_r$ denotes the identity and $0_r$ denotes a zero matrix of orders r. It should be noted that in order to move from the time domain to the multiwavelet domain and vice versa, the forward and inverse multiwavelet transforms can be similarly defined, see Fritz Keinert, Wavelets and Multiwavelets, Chapman & Hall, 2004, which is herein incorporated in its entirety by reference into the specification.

A discrete multiwavelet transform (DMWT) is defined, similarly to the equation (3.4) in the background section, to act on a vector-valued input signal $\{C^{(1)}(i) \in R^r\}$, using the analysis filters, for example as follows:

$$C^{(0)}(i) = \sum_j \tilde{H}_{j-2i} C^{(1)}(j), D^{(0)}(i) = \sum_j \tilde{G}_{j-2i} C^{(1)}(j), \quad (3.9)$$

We then mark $\{C^{(0)}(i) \in R^r\}$ as the reduced coarser sub-signal, and $\{D^{(0)}(i) \in R^r\}$ as the reduced detailed sub-signal.

Finally, as in equation (3.5) of the background section, given the coarser sub-signal $\{C^{(0)}(i) \in R^r\}$, and the detailed sub-signal $\{D^{(0)}(i) \in R^r\}$, the inverse discrete multiwavelet transform (IDMWT) is defined using the synthesis filters, preferably as follows:

$$C^{(1)}(2i) = \sum_j H_{2(i-j)} C^{(0)}(j) + \sum_j G_{2(i-j)} D^{(0)}(j), \quad (3.10)$$

$$C^{(1)}(2i+1) = \sum_j H_{2(i-j)+1} C^{(0)}(j) + \sum_j G_{2(i-j)+1} D^{(0)}(j).$$

Before explaining in detail the multidimensional DMWT, we provide a detailed explanation for a 1-dimensional DMWT for a 1-dimensional scalar signal using the aforementioned 1-dimensional vector-valued dataset.

For clarity, $C^{(l)}$ denotes a 1-dimensional vector-valued dataset, which is defined as described above, and $n=2^l$ denotes the length of $C^{(l)}$. The 1-dimensional vector-valued dataset is defined as follows:

$$C^{(l)}=(c^{(l)}(i) \in R^r, 0 \le i < n),$$

of order r. We define analysis filters to be $\tilde{H} \in M^r$ and $\tilde{G}_k \in M^r$. Based thereupon a 1-dimensional DMWT is defined using (3.9) of the background section, as follows:

$$DMWT_1(C^{(l)})=(C^{(l-1)}) (D^{(l-1)}),$$

with $C^{(l-1)}$ as the reduced coarser sub-signal, for example: and $$C^{(l-1)} = \left( c^{(l-1)}(i) = \Sigma_j \tilde{H}_{j-2i} c^{(l)}(j), 0 \le i < \frac{n}{2} \right), \text{ and } D^{(l-1)}$$

as the reduced detailed sub-signal, for example:

$$D^{(l-1)} = \left( d^{(l-1)}(i) = \sum_j \tilde{G}_{j-2i} c^{(l)}(j), 0 \le i < \frac{n}{2} \right).$$

It should be noted that $C^{(l-1)}$ and $D^{(l-1)}$ are essentially of half the length of the original signal. In use, as the received signal is finite, special attention should be given to the boundary-points. However, the boundary-points can be handled using methods such as periodic extension method, symmetric extension method, etc., see C. M. Brislawn, Preservation of sub-band symmetry in multi-rate signal coding, IEEE Transactions on Signal Processing, 43(12):3046-3050, 1995 which is herein incorporated in its entirety by reference into the specification. Using such methods for handling the boundary points is generally well known and therefore is not described here in greater detail.

A forward transform can then be further applied to either, or both, of the reduced sub-signals until the sub-signals' length reaches one. For example, we define $DMWT_1^{(l)}$ as the recursive transform applied to the coarser sub-signal only, for example:

$$DMWT_1^{(l)}(C^{(l)}) = (C^{(0)}D^{(0)}D^{(1)} \ldots D^{(l-1)}), \tag{3.11}$$

where the recursive 1-depth $DMWT_1^{(l)}$ algorithm is defined as follows:

For k=1, . . . , 1 Do
    $DMWT_1(C^{(k)}) = (C^{(k-1)}D^{(k-1)})$
End For

In the same manner, the 1-dimensional IDMWT can be defined using (3.10), as follows:

$$C^{(l)} = IDMWT_1(C^{(l-1)}D^{(l-1)})$$

and the respective recursive $$C^{(l)} = IDMWT_1^{(l)}(C^{(0)}D^{(0)}D^{(1)} \ldots D^{(l-1)}), \tag{3.12}$$

inverse transform, $IDMWT_1^{(l)}$, is defined by:
where the recursive 1-depth $IDMWT_1^{(l)}$ algorithm is defined as follows:
For k=1, . . . , 1 Do
    $C^{(k)} = IDMWT_1(C^{(k-1)}D^{(k-1)})$.
End For For clarity, the recursive 1-dimensional transform for scalar signals is defined according to number of definitions and notations. The steps are defined as follows:

First, the scalar signal is defined to be as in (2.6) with the parameters (2.3), for example as follows:

$$N = p \times n \times r; n = 2^l. \tag{3.13}$$

It should be noted that the level number l that determines the depth of the DMWT, and the multiwavelet order r that defines the type of multiwavelet transform, may be preferably predefined so as, for example, to achieve better compression rates. This may then possibly contradict the initial scalar signal dimension N. However, in practice, such a contradiction is settled by appropriate re-dimensioning, such as chopping or extending the initial signal without much distortion or redundant overhead. Preferably, such a proper adjustment is made and therefore (3.13) holds.

As described above, the vector-valued dataset is built using a consecutive indexing, an interleaved indexing method, or a mixed indexing method. Thus, using the notations as in (2.7), (2.8), and (2.9), a 1-dimensional outer cube is defined as follows:

$$O^{(p)} = (C_{i_p}^{(n)} \in R^{(n,r)}, 0 \leq i_p < p),$$

where the order is p. The 1-dimensional inner cubes are defined as follows:

$$C_{i_p}^{(n)} = (V_{ip,in}^{(r)} \in R^r, 0 \leq i_n < n), \tag{3.14}$$

of order n, and where the vectors are defined as follows:

$$V_{ip,in}^{(r)} = (v_{ip,in}(i_r) \in R, 0 \leq i_r < r),$$

where the order is p. However, it should be noted that now we can use $C_{i_p}^{(l)}$ instead of $C_{i_p}^{(n)}$ in equation (3.14), to refer to the possible maximum depth of the recursive multiwavelet transform.

1-depth recursive $DMWT_1^{(l)}$, which is defined in (3.11) above, is defined for each one of the inner cubes, which are defined in (3.14), with the boundary properly extended, preferably as follows:

$$DMWT_1^{(l)}(C_{i_p}^{(l)}) = (C_{i_p}^{(0)}D_{i_p}^{(0)}D_{i_p}^{(1)} \ldots D_{i_p}^{(l-1)}),$$

for each $0 \leq i_p < p$. Similarly, we define the $IDMWT_1^{(l)}$ as in (3.12) above, by $$C_{i_p}^{(l)} = IDMWT_1^{(l)}(C_{i_p}^{(0)}D_{i_p}^{(0)}D_{i_p}^{(1)} \ldots D_{i_p}^{(l-1)}).$$

It should be noted that the inner cube boundaries are preferably extended properly, and such an extension may be carried out either globally using the neighboring inner blocks, or locally using standard extension methods.

Following the above explanation for a 1-dimensional DMWT and IDMWT for a 1-dimensional scalar signal using the aforementioned 1-dimensional vector-valued dataset, an explanation of the multidimensional DMWT and IDMWT, is given. The multiwavelet algorithms for multidimensional scalar signals are now described according to steps, which are similar to the steps of previously described 1-dimensional DMWT algorithm. For clarity, a specific simple case of vector-valued signals is provided and then a more general case of scalar signals.

For clarity, a 2-dimensional vector-valued image of dimensions $n_1 \cdot n_2$ and $$C^{(l_1, l_2)} = \begin{pmatrix} 0 \leq i_k < n_k, \\ c(i_1, i_2) \in \mathcal{R}^r, & n_k = 2^{l_k}, \\ k = 1, 2 \end{pmatrix}. \tag{3.15}$$

vector of order r are considered. A 2-dimensional forward transform is defined with two iterations of the previously described 1-dimensional $DMWT_1$. In one embodiment, the 2-dimensional forward transform is used to transform the 2-dimensional vector-valued image as follows:

During the first iteration, the previously described 1-dimensional $DMWT_1$ is applied to each one of the rows of (3.15). During the second iteration, the previously described 1-dimensional $DMWT_1$ is applied to the columns of (3.15).

In particular, during the first iteration, where the $i_1^{th}$ row of (3.15) is defined as follows:

$$C_{(i_1,:)}^{(l_2)} = (c(i_1, i) \in R^r, 0 \leq i < n_2), 0 \leq i_1 < n_1. \tag{3.16}$$

and the transformed image is denoted as follows:

$$C^{(0,1)(l_1, l_2)} = \begin{pmatrix} C_{(0,:)}^{(l_2-1)} & D_{(0,:)}^{(l_2-1)} \\ \vdots & \vdots \\ C_{(n_1-1,:)}^{(l_2-1)} & D_{(n_1-1,:)}^{(l_2-1)} \end{pmatrix}. \tag{3.17}$$

During the second iteration, where the respective $i_2^{th}$ column of (3.17) may be similarly denoted as follows:

$$C_{(:,i_2)}^{(0,1)(l_1)} = (c^{(0,1)}(i, i_2) \in R^T, 0 \leq i < n_1), 0 \leq i_2 < n_2. \tag{3.18}$$

and the $DMWT_1$ is applied to each such one of the columns in (3.18), giving:
Based $$DMWT_1\left(C_{(:,i_2)}^{(0,1)(l_1)}\right) = \begin{pmatrix} C_{(:,i_2)}^{(0,1)(l_1-1)} \\ D_{(:,i_2)}^{(0,1)(l_1-1)} \end{pmatrix},$$

thereupon, the final transformed image may be denoted as:

$$C^{(1,1)(l_1,l_2)} = \begin{pmatrix} C^{(0,1)(l_1-1)}_{(:,0)} & \ldots & C^{(0,1)(l_1-1)}_{(:,n_2-1)} \\ D^{(0,1)(l_1-1)}_{(:,0)} & \ldots & D^{(0,1)(l_1-1)}_{(:,n_2-1)} \end{pmatrix}.$$

Therefore, the 2-dimensional forward transform may be defined as follows:

$$DMWT_2(C^{(l_1,l_2)}) = \begin{pmatrix} C^{(1,1)(l_1-1,l_2-1)}_{0,0} & C^{(1,1)(l_1-1,l_2-1)}_{0,1} \\ C^{(1,1)(l_1-1,l_2-1)}_{1,0} & C^{(1,1)(l_1-1,l_2-1)}_{1,1} \end{pmatrix},$$

$$C^{(1,1)(l_1-1,l_2-1)}_{i,j} \in \mathcal{R}^{(\frac{n_1}{2}, \frac{n_2}{2})},$$

$$i, j = 0, 1.$$

It should be noted that in case $l_1=0$, no transformation should be applied in the second iteration. In such the 2-dimensional forward transform may be defined as follows:

$$DMWT_2(C^{(0,l_2)}) = \begin{pmatrix} C^{(0,1)(0,l_2-1)}_{0,0} & C^{(0,1)(0,l_2-1)}_{0,1} \end{pmatrix},$$

$$C^{(0,1)(l_1-1,l_2-1)}_{0,j} \in \mathcal{R}^{(1, \frac{n_2}{2})}$$

$$j = 0, 1,$$

In such a manner, in case $l_2=0$, no transformation should be applied in the second iteration. In such the 2-dimensional forward transform may be defined as follows: In one embodiment of the present invention, $DMWT_2$ is applied recursively to some or all of the aforementioned four sub-images until the dimension reach one level. For example, a recursive algorithm is applied to the coarsest top left sub-image, as in the following recursive 1-depth $DMWT_2^{(l)}$ algorithm that is given in a pseudo-code:

---

$l = \max(l_1, l_2)$
For $k = 1, \ldots, 1$ Do
   If $l_1 = 0$
      $l_2 -= 1$, $$DMWT_2(C^{(0,l_2+1)}) = \begin{pmatrix} C^{(0,1)(0,l_2)}_{0,0} & C^{(0,1)(0,l_2)}_{0,1} \end{pmatrix}, C^{(0,l_2)} = C^{(0,1)(0,l_2)}_{0,0}.$$

Else If $l_2 = 0$
      $l_1 -= 1$, $$DMWT_2(C^{(l_1+1,0)}) = \begin{pmatrix} C^{(1,0)(l_1,0)}_{0,0} \\ C^{(1,0)(l_1,0)}_{1,0} \end{pmatrix}, C^{(l_1,0)} = C^{(1,0)(l_1,0)}_{0,0}.$$

Else
      $l_1 -= 1, l_2 -= 1$, $$DMWT_2(C^{(l_1+1,l_2+1)}) = \begin{pmatrix} C^{(1,1)(l_1,l_2)}_{0,0} & C^{(1,1)(l_1,l_2)}_{0,1} \\ C^{(1,1)(l_1,l_2)}_{1,0} & C^{(1,1)(l_1,l_2)}_{1,1} \end{pmatrix},$$

$$C^{(l_1,l_2)} = C^{(1,1)(l_1,l_2)}_{0,0}.$$

End If
End For

---

Clearly, the $IDMWT_2^{(l)}$ may be defined and calculated in a similar manner.

The general case of multidimensional vector-valued signals, for $C^{(l_1, \ldots, l_k)}$ may be defined as follows:

$$C^{(l_1, \ldots, l_K)} = \left( c(i_1, \ldots, i_K) \in \mathcal{R}^r, \begin{array}{c} 0 \le i_k < n_k \\ k = 1, \ldots, K \end{array} \right),$$

of dimensions $n_1 \times \ldots \times n_K$ and vector order $r$, where $n_k = 2^{l_k}$. Such an expression can be used to define a multidimensional forward transform that has K iterations of the $DMWT_1$. During the first iterations of the transform, the $DMWT_1$ is applied to the rows in the $1^{st}$ direction. During the second iterations of the $$DMWT_K(C^{(l_1, \ldots, l_K)}) = \left\{ C^{(m_1, \ldots, m_K)(l'_1, \ldots, l'_K)}_{(i_1, \ldots, i_K)}, \begin{array}{c} m_k = (l_k > 0), \\ l'_k = l_k - m_k, \\ i_k - 0, m_k, \\ k = 1, \ldots, K. \end{array} \right\}$$

transform, the $DMWT_1$ is applied to the $2^{nd}$ direction, etc. The process is recursively repeated until the $K^{th}$ direction is included. In particular, the transformation is denoted as follows:

where $m_k = 0$ implies that no transform is applied in the given direction.

The $IDMWT_k^{(l)}$ is defined in a similar manner to the $DMWT_2^{(l)}$, as in the following recursive 1-depth $DMWT_k^{(l)}$ algorithm that is given in a pseudo-code:

---

$l = \max(l_1, \ldots, l_K)$
For $k = 1, \ldots, 1$ Do
   For $k = 1, \ldots, K$ Do
      $m_k = (l_k > 0)$,
      $l'_k = l_k - m_k$.
   End For.

$$DMWT_K(C^{(l_1, \ldots, l_K)}) = \left\{ C^{(m_1, \ldots, m_K)(l'_1, \ldots, l'_K)}_{(i_1, \ldots, i_K)}, \begin{array}{c} i_j = 0, m_k \\ j = 1, \ldots, K \end{array} \right\},$$

$$C^{(l'_1, \ldots, l'_K)} = C^{(m_1, \ldots, m_K)(l'_1, \ldots, l'_K)}_{0, \ldots, 0}.$$

For $k = 1, \ldots, K$ Do $l_k = l'_k$ End For.

End For

--- where the inverse transform $IDMWT_k^{(l)}$ may be similarly defined.

Briefly stated, the multidimensional recursive transforms of scalar signals are defined as follows:

1. Receiving a multidimensional scalar signal, that can be defined as in (2.1) with parameters as in (2.2).

2. Using an indexing method, such as a consecutive indexing method, interleaved indexing method, or mixed indexing method to build a generic data structure, such as the following multidimensional outer cube:

$$O^{(p_1, \ldots, p_K)} = \left( C^{(n_1, \ldots, n_K)}_{i_{p_1}, \ldots, i_{p_K}} \in \mathcal{R}^{(n_1, \ldots, n_K, r)}, \begin{array}{c} 0 \le i_{p_k} < p_k \\ 1 \le k \le K \end{array} \right),$$

of order $p_{l'} \cdots p_K$, having multidimensional inner cubes, such as the following:

$$C_{i_{p_1}, \ldots, i_{p_K}}^{(n_1, \ldots, n_K)} = \left( V_{i_{p_1}, \ldots, i_{p_K}, i_{n_1}, \ldots, i_{n_K}}^{(r)} \in \mathcal{R}^r, \begin{array}{l} 0 \leq i_{n_k} < n_k \\ 1 \leq k \leq K \end{array} \right), \quad (3.19)$$

of order $n_{l'} \cdots n_K$, having vectors, which are defined as follows:

$$V_{i_{p_1}, \ldots, i_{p_K}, i_{n_1}, \ldots, i_{n_K}}^{(r)} = \left( v_{i_{p_1}, \ldots, i_{p_K}, i_{n_1}, \ldots, i_{n_K}}(i_r) \in \mathcal{R}, 0 \leq i_r < r \right),$$

of order $r = r_{l'} \cdots r_K$.

3. Applying a recursive forward transform, such as the aforementioned recursive 1-depth $\text{DMWT}_k^{(l)}$ algorithm, to each one of the inner cubes in (3.19).

It should be noted that a recursive inverse transform may be similarly defined using the aforementioned recursive 1-depth $\text{IDMWT}_k^{(l)}$. The discrete multiwavelet transform, which is related for multiwavelets of order $r=1$, as described above, is the well-known discrete wavelet transform.

Reference is now made to another embodiment of the present invention, which is related to the DWT, using respective constant diagonal multiwavelet filter coefficient matrices. For clarity, we refer to the particular DWT as described above in the background section. For example, let the scalar scaling coefficients be as in (3.1) and the lowpass $\{\tilde{h}_k\}$ analysis filter and the lowpass $\{h_k\}$ synthesis filters be as in (3.6), where $\{\tilde{H}_k = \tilde{h}_k I_r\}$ and $\{H_k = h_k I_r\}$. In the same manner, let $\{\tilde{G}_k = \tilde{g}_k I_r\}$ and $\{G_k = g_k I_r\}$, as in (3.7) and the matrix multiwavelet coefficients corresponding to the scalar wavelet coefficients in (3.2). Based on such definitions it is clear that the above multiwavelet coefficients correspond to a respective set of refinable vector-valued functions for which the biorthogonal conditions, which are described in (3.8), hold. In such a manner, these coefficients for the multiwavelet transform of the previous chapter can be used. Such a transform, which may be referred to as a generalized DWT (GDWT), is mathematically the same as the standard DWT for proper boundary.

For clarity, the basic 1-dimensional case of the GDWT is given before the multidimensional case. In one example, a scalar signal of order $N=20$, such as $S^{(20)}=\{0, 1, \ldots, 18, 19\}$ is used. A respective generic data structure is created for the following parameters $p=1$, $n=4$ and $r=5$ using a method of interleaved indexing. Then, as described above, we obtain a 1-dimensional outer cube with $p=1$ inner cubes of dimensions $n=4$ and vectors that are in order $r=5$, as follows:

$$O^{(1)} = \left( \left( \begin{pmatrix} 0 \\ 4 \\ 8 \\ 12 \\ 16 \end{pmatrix} \begin{pmatrix} 1 \\ 5 \\ 9 \\ 13 \\ 17 \end{pmatrix} \begin{pmatrix} 2 \\ 6 \\ 10 \\ 14 \\ 18 \end{pmatrix} \begin{pmatrix} 3 \\ 7 \\ 11 \\ 15 \\ 19 \end{pmatrix} \right) \right). \quad (4.1)$$

Preferably, let the periodically extended scalar signal be $\{\ldots, 18, 19, 0, 1, \ldots, 18, 19, 0, 1, \ldots\}$ and similarly, let the periodically extended generic data structure be as follows:

$$\left( \ldots \left( \begin{pmatrix} 0 \\ 4 \\ 8 \\ 12 \\ 16 \end{pmatrix} \begin{pmatrix} 1 \\ 5 \\ 9 \\ 13 \\ 17 \end{pmatrix} \begin{pmatrix} 2 \\ 6 \\ 10 \\ 14 \\ 18 \end{pmatrix} \begin{pmatrix} 3 \\ 7 \\ 11 \\ 15 \\ 19 \end{pmatrix} \right) \right)$$

$$\left( \left( \begin{pmatrix} 0 \\ 4 \\ 8 \\ 12 \\ 16 \end{pmatrix} \begin{pmatrix} 1 \\ 5 \\ 9 \\ 13 \\ 17 \end{pmatrix} \begin{pmatrix} 2 \\ 6 \\ 10 \\ 14 \\ 18 \end{pmatrix} \begin{pmatrix} 3 \\ 7 \\ 11 \\ 15 \\ 19 \end{pmatrix} \right) \left( \begin{pmatrix} 0 \\ 4 \\ 8 \\ 12 \\ 16 \end{pmatrix} \begin{pmatrix} 1 \\ 5 \\ 9 \\ 13 \\ 17 \end{pmatrix} \begin{pmatrix} 2 \\ 6 \\ 10 \\ 14 \\ 18 \end{pmatrix} \begin{pmatrix} 3 \\ 7 \\ 11 \\ 15 \\ 19 \end{pmatrix} \right) \ldots \right).$$

It should be noted that applying the GDWT on the extended vector-valued signal will not produce the same results as applying the DWT on the extended original signal. However, by a downward cyclic shift of the original vectors (4.1), proper (n=4) left boundary vectors are acquired, for example:

$$\left( \left( \begin{pmatrix} 16 \\ 0 \\ 4 \\ 8 \\ 12 \end{pmatrix} \begin{pmatrix} 17 \\ 1 \\ 5 \\ 9 \\ 13 \end{pmatrix} \begin{pmatrix} 18 \\ 2 \\ 6 \\ 10 \\ 14 \end{pmatrix} \begin{pmatrix} 19 \\ 3 \\ 7 \\ 11 \\ 15 \end{pmatrix} \right) \right),$$

and similarly, by applying an upward cyclic shift the proper, (n=4), right boundary vectors are acquired, for example:

$$\left( \left( \begin{pmatrix} 4 \\ 8 \\ 12 \\ 16 \\ 0 \end{pmatrix} \begin{pmatrix} 5 \\ 9 \\ 13 \\ 17 \\ 1 \end{pmatrix} \begin{pmatrix} 6 \\ 10 \\ 14 \\ 18 \\ 2 \end{pmatrix} \begin{pmatrix} 7 \\ 11 \\ 15 \\ 19 \\ 3 \end{pmatrix} \right) \right).$$

Additional cyclic shifts produce additional boundary vectors as needed. The two algorithms, the DWT and GDWT, are then mathematically the same.

For clarity, reference is now made to the general case wherein $p>1$. For example, where $N=60$, $S_{(60)}=\{0, 1, 2, 3, \ldots, 56, 57, 58, 59\}$, $p=3$, $n=4$, $l=2$ and $r=5$. A new vector-valued dataset that has been generated according to $S_{(60)}$ and the related parameters is preferably defined as follows:

$$O^{(3)} = \left( \left( \begin{pmatrix} 0 \\ 4 \\ 8 \\ 12 \\ 16 \end{pmatrix} \begin{pmatrix} 1 \\ 5 \\ 9 \\ 13 \\ 17 \end{pmatrix} \begin{pmatrix} 2 \\ 6 \\ 10 \\ 14 \\ 18 \end{pmatrix} \begin{pmatrix} 3 \\ 7 \\ 11 \\ 15 \\ 19 \end{pmatrix} \right) \right. \quad (4.2)$$

$$\left( \begin{pmatrix} 20 \\ 24 \\ 28 \\ 32 \\ 36 \end{pmatrix} \begin{pmatrix} 21 \\ 25 \\ 29 \\ 33 \\ 37 \end{pmatrix} \begin{pmatrix} 22 \\ 26 \\ 30 \\ 34 \\ 38 \end{pmatrix} \begin{pmatrix} 23 \\ 27 \\ 31 \\ 35 \\ 39 \end{pmatrix} \right) \left( \begin{pmatrix} 40 \\ 44 \\ 48 \\ 52 \\ 56 \end{pmatrix} \begin{pmatrix} 41 \\ 45 \\ 49 \\ 53 \\ 57 \end{pmatrix} \begin{pmatrix} 42 \\ 46 \\ 50 \\ 54 \\ 58 \end{pmatrix} \begin{pmatrix} 43 \\ 47 \\ 51 \\ 55 \\ 59 \end{pmatrix} \right) \right),$$

The proper boundary vectors are then computed as follows:
1. First, the vector coefficients of each inner cube is a moved in a consecutively cyclic shift upward, as follows:

$$\left(\left(\left(\begin{array}{c}4\\8\\12\\16\\20\end{array}\right)\left(\begin{array}{c}5\\9\\13\\17\\21\end{array}\right)\left(\begin{array}{c}6\\10\\14\\18\\22\end{array}\right)\left(\begin{array}{c}7\\11\\15\\19\\23\end{array}\right)\right)\left(\begin{array}{c}24\\28\\32\\36\\40\end{array}\right)\left(\begin{array}{c}25\\29\\33\\37\\41\end{array}\right)\left(\begin{array}{c}26\\30\\34\\38\\42\end{array}\right)\left(\begin{array}{c}27\\31\\35\\39\\43\end{array}\right)\right)\left(\left(\begin{array}{c}44\\48\\52\\56\\0\end{array}\right)\left(\begin{array}{c}45\\49\\53\\57\\1\end{array}\right)\left(\begin{array}{c}46\\50\\54\\58\\2\end{array}\right)\left(\begin{array}{c}47\\51\\55\\59\\3\end{array}\right)\right)\right).$$

The shift upward moves the next inner cube topmost coefficients to become the current inner cube new bottommost coefficients, in a cyclic manner. The new upwardly shifted inner cubes are then the (n=4) boundary vectors to the right of the respective inner cube in (4.2). Additional shifts produce additional boundary vectors.

2. Second, the vector coefficients of each inner cube is moved consecutively cyclic shift downward, as follows:

$$\left(\left(\left(\begin{array}{c}56\\0\\4\\8\\12\end{array}\right)\left(\begin{array}{c}57\\1\\5\\9\\13\end{array}\right)\left(\begin{array}{c}58\\2\\6\\10\\14\end{array}\right)\left(\begin{array}{c}59\\3\\7\\11\\15\end{array}\right)\right)\left(\begin{array}{c}16\\20\\24\\28\\32\end{array}\right)\left(\begin{array}{c}17\\21\\25\\29\\33\end{array}\right)\left(\begin{array}{c}18\\22\\26\\30\\34\end{array}\right)\left(\begin{array}{c}19\\23\\27\\31\\35\end{array}\right)\right)\left(\left(\begin{array}{c}36\\40\\44\\48\\52\end{array}\right)\left(\begin{array}{c}37\\41\\45\\49\\53\end{array}\right)\left(\begin{array}{c}38\\42\\46\\50\\54\end{array}\right)\left(\begin{array}{c}39\\43\\47\\51\\55\end{array}\right)\right)\right),$$

where the previous inner cubes bottommost coefficients become new current inner cubes topmost coefficients. Then these new downward shifted inner cubes are the (n=4) boundary vectors to the left of the respective inner cubes in (4.2). Additional shifting produces additional boundary vectors.

The 1-depth recursive GDWT algorithm, $GDWT_1^{(l)}$, which is preferably defined similarly to $DMWT_1^{(l)}$, is mathematically equivalent to the respective 1-depth standard DWT. Note that other boundary extension methods, such as a symmetric extension method, can be similarly implemented. After a description of the basic 1-dimensional case has been provided, reference is now made to a description of the multidimensional case. In one example, multidimensional scalar signals, such as in (2.1), with input parameters as in (2.2) are received. The $GDWT_k^{(l)}$ is defined respectively to the aforementioned recursive 1-depth $DMWT_k^{(l)}$ algorithm with the appropriate constant diagonal matrix filters. Then, as described above, aside from the boundary, this algorithm is mathematically the same as a respective 1-depth multidimensional standard DWT. The proper method for extending the boundary of 1-dimensional signals has been discussed above, and can be extended to multidimensional signals. However, in this section, an alternative and more intuitive way for computing these boundary values is presented.

In the following section, a 2-dimensional image example of FIG. 3 and a corresponding vector-valued dataset, as in FIG. 5 are used for describing the multidimensional case.

In order to build proper boundary points to the right of the respective inner cube, the image rows in FIG. 3 are cyclically shifted to the left ($n_2$=4) times, preferably as depicted in FIG. 9. Then, a respective vector-valued dataset is computed for the new shifted image, resulting in an outer cube, preferably as depicted in FIG. 10.

Figure 11:
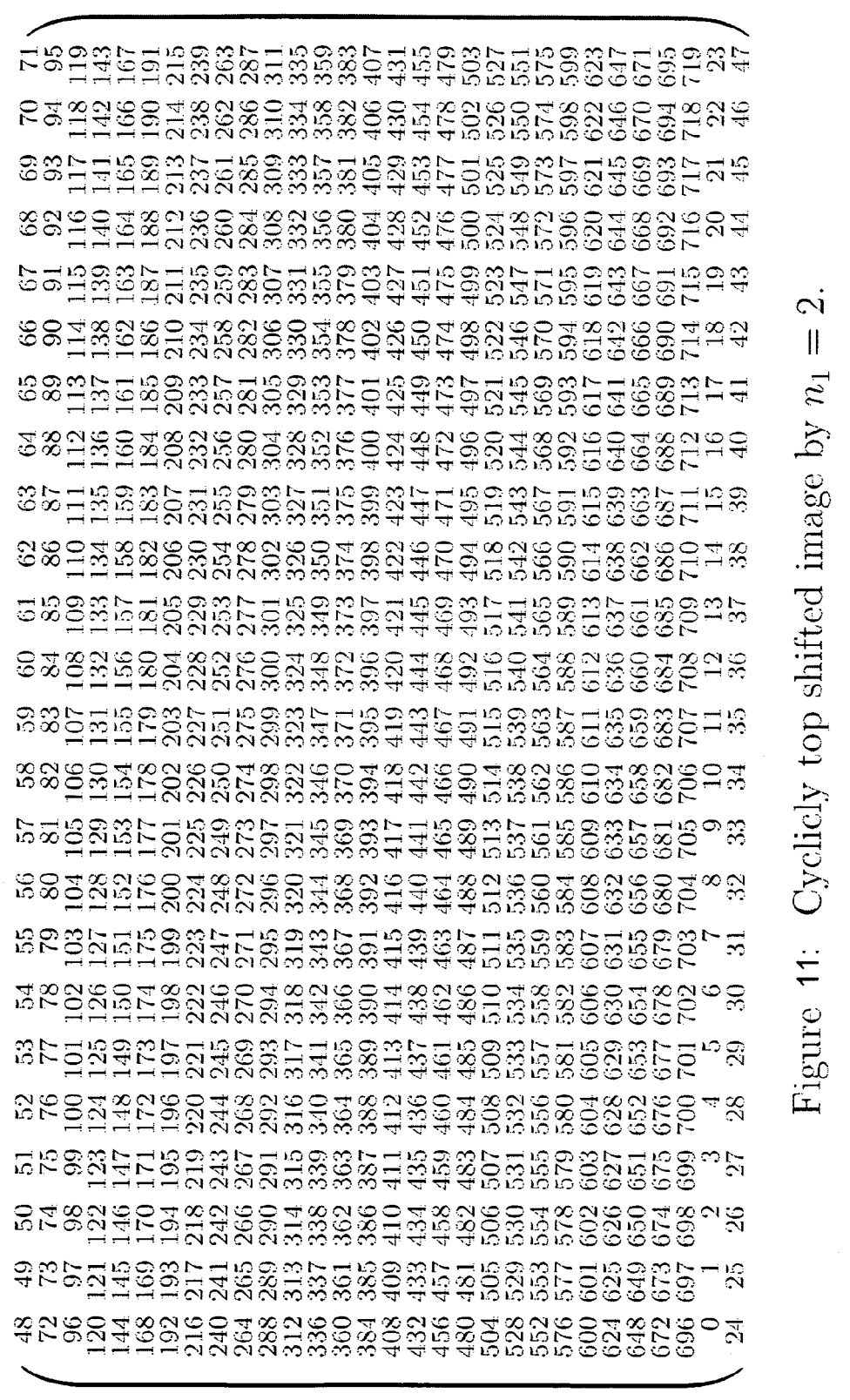

The new inner cubes of FIG. 10 corresponds to respective n2=4 boundary vectors to the right of the original inner cubes in FIG. 5. In addition to such a shifting boundary points are produced. Similarly, the other boundary points, to the left, top and bottom of the original inner cubes in FIG. 5 are computed. For example, the cyclically top shifted image of FIG. 3 is depicted in FIG. 11. The corresponding boundary vectors to the bottom of the original inner cubes are depicted in FIG. 12.

The multidimensional case easily generated as follows. The $k^{th}$ directional boundary points are computed by a proper $k^{th}$ directional shift in the original multidimensional scalar signal and the respective transform to the generic data structure. The new shifted inner cubes then correspond to the $n_k^{th}$ boundary vectors on the proper side of the respective original inner cubes. Additional shifting produces additional boundary points.

Figure 13:
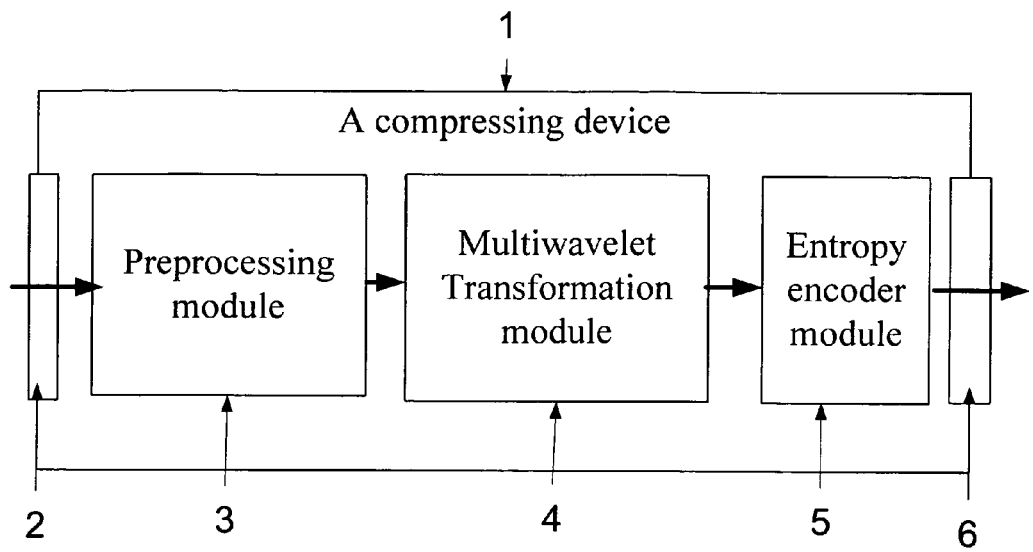
FIG. 13 is a schematic illustration of a device for compressing digital data such as an image or a video using multiwavelet transformation, according to a preferred embodiment of the present invention.

Reference is now made to FIG. 13, which is a schematic illustration of a device 1 for compressing digital data, such as an image or a video, using multiwavelet transformation, according to a preferred embodiment of the present invention. As depicted in FIG. 13, the device 1 comprises an input interface 2 for receiving the digital data, a preprocessing module 3 for generating a vector-valued dataset according to the received digital data, and a multiwavelet transformation module 4 for transforming the vector-valued dataset into a set of multiwavelet coefficients, preferably using the aforementioned multidimensional DMWT algorithm. The device further comprises an entropy encoder module 5 for quantifying the multiwavelet coefficients and for entropically coding the quantified multiwavelet coefficients, as described above. Preferably, the entropically coded quantified multiwavelet coefficients are outputted via a designated output interface 6.

In one embodiment of the present invention, an encoder device using the compression method cited above is disclosed. The encoder is not described hereinafter as it is substantially made up of the same functional modules as the compressing device 1.

Figure 14:
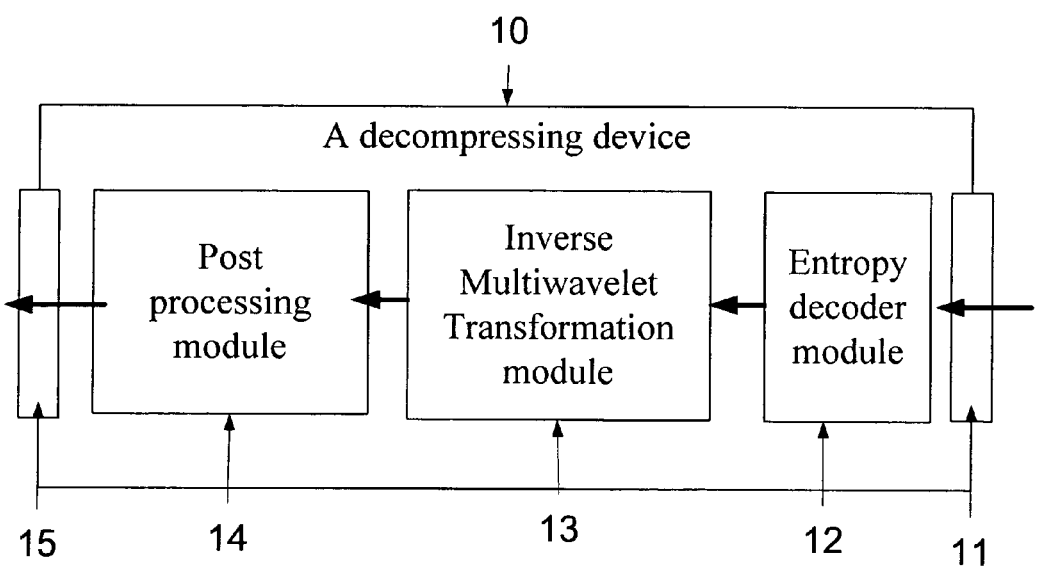
FIG. 14 is a schematic illustration of a device for decompressing digital data such as an image or a video using inverse multiwavelet transformation, according to a preferred embodiment of the present invention.

Reference is now made to FIG. 14, which is a schematic illustration of a device 10 for decompressing digital data, such as an image or a video, using inverse multiwavelet transformation, according to a preferred embodiment of the present invention. As depicted in FIG. 14, the device 10 comprises an input interface 11 adapted for receiving encoded digital data and an entropy decoder module 12 for deciphering the encoded digital data and reconstructing a set of multiwavelet coefficients from it. The reconstructed set of multiwavelet coefficients is forwarded to an inverse multiwavelet transformation module 13 that transforms the reconstructed set of multiwavelet coefficients to a vector-valued dataset using preferably the aforementioned multidimensional IDMWT algorithm. The vector-valued dataset is forwarded to a post-processing module 14 that is configured to transform the vector-valued dataset back into the original scalar representation thereof. For example, when the received encoded digital data represents a video sequence, the post-processing module 14 reconstructs the original frame sequence therefrom. Preferably, the reconstructed digital data is outputted via a designated output interface 15.

In one embodiment of the present invention, a decoder device that uses the aforementioned decompression method is disclosed. The decoder is not described hereinafter as it is substantially made up of the same functional modules as the decompressing device 10.

In one embodiment of the present invention, a compressor/decompressor or coder/decoder, which may be referred to as a CODEC, comprises the aforementioned compressing and decompressing devices. It should be noted that the invention is not limited to the compression method, the decompression method, the compressor, the decompressor and the codec described above by way of example only.

It is expected that during the life of this patent many relevant devices and systems will be developed and the scope of the terms herein, particularly of the terms network, video, audio, images, and digital data is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for compressing digital data, comprising:
   a) providing a plurality of multidimensional scalar signals representing a plurality of single color component pixels of a plurality of color images;
   b) generating a plurality of vector-valued datasets each from another of said multidimensional scalar signals and comprising a multidimensional outer cube of a plurality of multidimensional inner cubes each of a plurality of vectors, wherein each said vector having values selected from respective said plurality of single color component pixels of a respective said multidimensional scalar signal;
   c) transforming said plurality of vectors of each said multidimensional inner cube of said multidimensional outer cube into a plurality of multiwavelet coefficients; and
   d) entropically coding said plurality of multiwavelet coefficients.

2. The method of claim 1, further comprising defining at least one non-scalar multiwavelet filter, said transforming is performed using said at least one non-scalar multiwavelet filter.

3. The method of claim 1, wherein said transforming allows a performance of a discrete wavelet transformation.

4. The method of claim 1, wherein said transforming is performed using a multiwavelet filter.

5. The method of claim 1, further comprising arranging said plurality of multiwavelet coefficients as scalar coefficients.

6. The method of claim 5, wherein said scalar coefficients are wavelet coefficients.

7. The method of claim 1, further comprising converting the color model of the digital data to a YUV color model.

8. The method of claim 1, wherein said digital data is a sequence of frames represented in YUV color model and further comprising partitioning said sequence of frames to Y, U and V group of frames (GOFs), said vector-valued datasets being generated according to each one of said Y, U and V GOFs separately.

9. The method of claim 1, wherein said vector-valued datasets is a first array having one or more dimensions of second arrays having one or more dimensions, wherein each said second array comprises a plurality of vectors of values of said digital data.

10. The method of claim 1, wherein said transforming is performed according to a multidimensional dyadic separable discrete multiwavelet transform.

11. The method of claim 1, wherein said digital data is represented in a multidimensional scalar signal.

12. The method of claim 1, wherein the generating is performed according to one member of the group consisting of: indexing said digital data in a consecutive manner, indexing said digital data in an interleaved manner, and indexing said digital data in a mixed manner.

13. The method of claim 1, wherein said transforming is performed using a set of biorthogonal multiwavelet filters.

14. The method of claim 1, wherein said plurality of color images having a plurality of pixels each said pixel represented by a plurality of color components;
   wherein said providing comprises:
   receiving said plurality color images, and
   separating said plurality of color components in said plurality color images to create said plurality of multidimensional scalar signals so that each said single color component pixel represents one of said plurality of color components.

15. An apparatus for compressing digital data, comprising:
   an input interface configured for receiving the digital data comprising a plurality of color images having a plurality of pixels, each said pixel represented by a plurality of color components;
   a preprocessing module, operatively connected to said input interface, said preprocessing module convertes said digital data to create a plurality of multidimensional scalar signals having a plurality of single color component pixels, each said single color component pixel represented by one of said plurality of color components by separating said plurality of color components in said plurality color images and generating a plurality of vector-valued datasets each from another of said multidimensional scalar signals and comprising a multidimensional outer cube of a plurality of multidimensional inner cubes each of a plurality of vectors, wherein each said vector having values selected from respective said plurality of single color component pixels of a respective said multidimensional scalar signal;
   a transformation module which transforms said plurality of vectors of each said multidimensional inner cube of said multidimensional outer cube into a plurality of multiwavelet coefficients; and
   an entropy-coding module which quantifies said plurality of multiwavelet coefficients and entropically coding said plurality of quantified multiwavelet coefficients.

16. The apparatus of claim 15, wherein said transformation module is configured for using at least one non-scalar multiwavelet filter during said transforming.

17. The apparatus of claim 15, wherein said plurality of multiwavelet coefficients are distributed in sub-bands.

18. The apparatus of claim 15, wherein said apparatus is used for decompressing, said apparatus further comprising:
   a second input interface configured for receiving the encoded digital data, said encoded digital data comprises a set of encoded multiwavelet coefficients;
   an entropy-decoding module for extracting said encoded multiwavelet coefficients from said encoded digital data;

an inverse transformation module for reconstructing vector-valued datasets from said decoded multiwavelet coefficients; and a post-processing module which produces a plurality of decoded color images according to said reconstructed vector-valued datasets.

19. A method for decompressing a plurality of encoded color images, comprising:

a) receiving a set of encoded multiwavelet coefficients;

b) entropically decoding said set of encoded multiwavelet coefficients;

c) reconstructing a plurality of vector-valued datasets by inverse transformation according to said set of decoded multiwavelet coefficients, each said vector-valued dataset comprising a multidimensional outer cube of a plurality of multidimensional inner cubes each of a plurality of vectors, wherein each said vector having values representing a plurality of single color component pixels of a plurality of color images, wherein said plurality of single color component pixels of said plurality of color images are represented by a plurality of multidimensional scalar signals; and d) producing said plurality of color images according to said plurality of reconstructed vector-valued datasets.

20. An apparatus for decompressing a plurality of encoded color images, comprising:

an input interface configured for receiving a set of encoded multiwavelet coefficients;

an entropy-decoding module for extracting said set of encoded multiwavelet coefficients from said plurality of encoded color images;

an inverse transformation module for reconstructing a plurality of vector-valued datasets from said set of decoded multiwavelet coefficients, each said vector-valued dataset comprising a multidimensional outer cube of a plurality of multidimensional inner cubes each of a plurality of vectors, wherein each said vector having values representing a plurality of single color component pixels of a plurality of color images, wherein said plurality of single color component pixels of said plurality of color images are represented by a plurality of multidimensional scalar signals; and a post-processing module which produces plurality of decoded color images according to said plurality of reconstructed vector-valued datasets.

* * * * *